(12) United States Patent
Burnett et al.

(10) Patent No.: US 10,188,121 B2
(45) Date of Patent: *Jan. 29, 2019

(54) BACTERIOPHAGE TREATMENT FOR REDUCING AND PREVENTING BACTERIAL CONTAMINATION

(71) Applicant: Ecolab USA Inc., St. Paul, MN (US)

(72) Inventors: Scott L. Burnett, St. Paul, MN (US); Timothy A. Gutzmann, Eagan, MN (US); Bruce R. Cords, Inver Grove Heights, MN (US)

(73) Assignee: Ecolab USA Inc., St. Paul, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/269,410

(22) Filed: Sep. 19, 2016

(65) Prior Publication Data

US 2017/0064972 A1 Mar. 9, 2017

Related U.S. Application Data

(63) Continuation of application No. 12/054,806, filed on Mar. 25, 2008, now Pat. No. 9,486,007.

(51) Int. Cl.
*A23L 1/185* (2006.01)
*A23B 4/22* (2006.01)
(Continued)

(52) U.S. Cl.
CPC .............. *A23B 4/22* (2013.01); *A23L 3/3463* (2013.01); *A23L 3/3571* (2013.01);
(Continued)

(58) Field of Classification Search
CPC ............................... B65D 81/24; B65D 81/261
(Continued)

(56) References Cited

U.S. PATENT DOCUMENTS

| | | | |
|---|---|---|---|
| 4,851,240 A | | 7/1989 | Day et al. |
| 5,573,801 A | * | 11/1996 | Wilhoit ................... A23B 4/22 |
| | | | 426/133 |

(Continued)

FOREIGN PATENT DOCUMENTS

EP      0290295      8/1992

OTHER PUBLICATIONS

Code of Federal Regulations, Title 40, vol. 23, "Protection of Environment," Section 180.1, Revised Jul. 1, 2007, U.S. Government Printing Office, 2 pages.

(Continued)

*Primary Examiner* — Helen F Heggestad
(74) *Attorney, Agent, or Firm* — Merchant & Gould P.C.

(57) ABSTRACT

A system and method for reducing or preventing bacterial contamination in food includes application of a bacteriophage treatment to any type of food product at any stage of processing the food product. The bacteriophage treatment may also be applied to non-food surfaces and water systems, which may be susceptible to bacterial contamination and subsequent spread of bacteria. The bacteriophage treatment comprises at least one bacteriophage in a concentration sufficient to reduce or prevent bacterial contamination from pathogenic bacteria and/or spoilage bacteria. In some embodiments, the bacteriophage is able to reduce or eliminate bacteria introduced to a food product after the bacteriophage treatment was applied to the food product. In some embodiments, the bacteriophage treatment includes a buffering agent to maintain the bacteriophage at a pH level that sustains the bacteriophage. In some embodiments, the bacteriophage treatment includes a surfactant and/or a thickener to aid in applying the bacteriophage. Additional adjuvants and enhancers may be used in some embodiments to stabi- (Continued)

lize the bacteriophage or enhance its performance as an antibacterial agent.

15 Claims, 9 Drawing Sheets

(51) Int. Cl.
    *A23L 3/3463*         (2006.01)
    *A23L 3/3571*         (2006.01)
    *B65B 25/00*          (2006.01)
    *B65D 81/26*          (2006.01)
    *B65D 81/28*          (2006.01)

(52) U.S. Cl.
    CPC .......... *B65B 25/001* (2013.01); *B65D 81/264* (2013.01); *B65D 81/28* (2013.01); *A23V 2002/00* (2013.01)

(58) Field of Classification Search
    USPC .................. 426/53, 61, 323, 324, 326, 532
    See application file for complete search history.

(56) References Cited

U.S. PATENT DOCUMENTS

| | | |
|---|---|---|
| 5,811,093 A | 9/1998 | Merril et al. |
| 6,461,608 B1 | 10/2002 | Averback et al. |
| 6,699,701 B1 | 3/2004 | Sulakvelidze et al. |
| 6,896,882 B2 | 5/2005 | Ramachandran et al. |
| 2004/0191224 A1 | 9/2004 | Sulakvelidze et al. |
| 2007/0020364 A1 | 1/2007 | Burnett et al. |
| 2008/0267900 A1 | 10/2008 | Steinbrenner et al. |

OTHER PUBLICATIONS

Davis et al., "Microbiology," $3^{rd}$ Ed., Harper & Row, (1980), pp. 874-877m 880-883, 10 pages.

Food Safety and Inspection Services, USDA, §430.4, pp. 663-665, 3 pages.

Thompson et al., Bacteriophage Inactivation at the Air-Water-Solid Interface in Dynamic Batch Systems, Applied and Environmental Microbiology, (Mar. 1999), 6 pages.

* cited by examiner

BACTERIOPHAGE TREATMENT FOR REDUCING AND PREVENTING BACTERIAL CONTAMINATION

CROSS-REFERENCE TO RELATED APPLICATION

This application is a continuation of U.S. application Ser. No. 12/054,806, filed Mar. 25, 2008, now U.S. Pat. No. 9,486,007, issued Nov. 8, 2016, the disclosure of which is incorporated in its entirety.

FIELD OF THE INVENTION

The present invention is related to compositions for and methods of reducing or eliminating bacterial contamination. More particularly, the present invention is related to using a bacteriophage treatment on food products and non-food surfaces, as well as in water systems, to prevent bacterial contamination in any type of food.

BACKGROUND OF THE INVENTION

During the processing, preparation and packaging of food products, the food product may encounter microorganisms which may make the food unsuitable for consumption. The microorganisms may come from the food itself, the food contact surfaces, and/or the surrounding environment. The microorganisms may range from pathogenic microorganisms (e.g. *Listeria monocytogenes*, Enterohemorraghic *Escherichia coli*, *Salmonella* and the like) to spoilage organisms that can affect the taste, color, and/or smell of the final food product (e.g., *Pseudomonas, Acinetobacter, Moraxella, Alcaligenes, Flavobacterium, Erwinia*, and the like). Microorganisms can affect a wide variety of food products including meat, poultry, fish and shellfish, cheese, fruits and vegetables, and pre-prepared foods. At certain levels, the presence of microorganisms on a food product may cause everything from a consumer's perception of a lower quality product, to regulatory investigations and sanctions, to foodbourne illness and death.

Food processors use a variety of methods during processing to control and/or reduce the presence of microorganisms on food products. These methods include everything from cleaning and sanitizing the food processing plant environment, applying or incorporating antimicrobials to or in the food product, irradiating the food product, applying heat, and others. Applying or incorporating an antimicrobial composition to or in the food product is a preferred way of controlling microorganisms. However, it is difficult to formulate a composition that is effective at reducing microorganisms using ingredients that are acceptable for direct food contact, according to government regulations. Further, it is difficult to formulate a composition that can be applied directly to a food product without adversely affecting the color, taste, or smell of the food product. Finally, once a food product has been treated with an antimicrobial composition or process to control the presence of microorganisms on the food product, the opportunity exists for the food product to become re-contaminated during further processing.

Food safety agencies have issued guidelines for processing food that may have exposure to surfaces contaminated with microorganisms including *Listeria monocytogenes* (*L. monocytogenes*), *Salmonella*, and *Escherichia coli* O157:H7 (commonly known as *E. coli*). For example, the Food Safety and Inspection Service (FSIS) of the U.S. Department of Agriculture (USDA) mandates that an establishment producing post-lethality exposed ready-to-eat (RTE) products must control or prevent *L. monocytogenes* in the processing environment. (See 9 C.F.R. § 430.4 for a listing of the requirements.) *L. monocytogenes* is a human pathogenic bacterium that occurs widely in both agricultural and food processing environments. *L. monocytogenes* grows at low oxygen conditions and refrigeration temperatures, and is commonly associated with recalls and outbreaks in ready to eat (RTE) meats and poultry products. *Salmonella* is another type of pathogenic bacterium that is prevalent on raw poultry, beef and pork. *E. coli.* is commonly associated with red meat, and contamination may often occur during slaughtering of cattle.

To prevent or reduce bacterial contamination, poultry and other meats are typically washed at any of several steps during the process of converting a live animal to an edible food product. However, a significant number of carcasses may become cross-contaminated during processing, which may include scalding, mechanical processing, and chilling. Moreover, water used for washing the carcasses at various processing stages is often used repeatedly over time. This provides an opportunity for spreading, rather than reducing or preventing, bacterial contamination.

For meat products, later processing steps also provide an opportunity for bacterial contamination and cross-contamination. For example, slicing equipment used for deli meat may become contaminated with bacteria, and then the slicing equipment may spread the bacteria to multiple food products. Even at the consumer level, food products may still become contaminated with bacteria. It is preferred that an antimicrobial or antibacterial treatment is able to continue to function as a bactericide after it is applied to a food product and throughout the shelf life of the food product.

The heightened concerns of consumers over the purity and safety of food products, as well as increased government regulations, has resulted in a need for an improved antibacterial product that may be used to prevent or reduce bacterial contamination at any stage during food processing and on any type of food, including meats, fruits, vegetables, and cheese, without adversely affecting the color, taste or smell of the food. There is a need for the antibacterial product to be usable on non-food surfaces and in other applications where cross-contamination and the spread of bacteria is common.

SUMMARY

A system and method for reducing or preventing bacterial contamination in food includes application of a bacteriophage treatment to any type of food product. The bacteriophage treatment may also be applied to non-food surfaces and water systems, which may be susceptible to bacterial contamination and subsequent spread of bacteria. The bacteriophage treatment may comprise at least one bacteriophage in a concentration sufficient to reduce or prevent bacterial contamination. Each bacteriophage in the treatment may target a selected type of bacteria, including pathogenic bacteria and spoilage bacteria. Examples of pathogenic bacteria that may be eliminated or reduced include, but are not limited to, *Listeria monocytogenes, Listeria* spp., *Salmonella, Campylobacter* spp., *Enterobacter sakazakii, Yersinia enterocolitica, Escherichia coli* (*E. coli*), *Shigella* spp., *Bacillus cereus*, and *Staphylococcus aureus*. Examples of spoilage bacteria that may be eliminated or reduced include, but are not limited to, *Xanthomonas* spp., *Pseudomonas* spp., *Enterococcus* spp., *Shewanella* spp., *Erwinia* spp., and lactic acid bacteria.

The bacteriophage treatment may be applied at any stage of processing a food product. In some embodiments, the bacteriophage is able to reduce or eliminate bacteria introduced to a food product after the bacteriophage treatment was applied to the food product. In some embodiments, the bacteriophage treatment includes a buffering agent to maintain the bacteriophage at a pH level that sustains the bacteriophage. In some embodiments, the bacteriophage treatment includes a surfactant and/or a thickener to aid in applying the bacteriophage. Additional adjuvants and enhancers may be used to stabilize the bacteriophage or enhance its performance as an antibacterial agent. The bacteriophage treatment may be dispensed and delivered using any known mode, which may depend, in part, on the particular application (for example, food product or non-food surface). The treatment may be combined with other treatments used to reduce bacterial contamination.

DETAILED DESCRIPTION OF THE INVENTION

Definitions

Figure 1A:
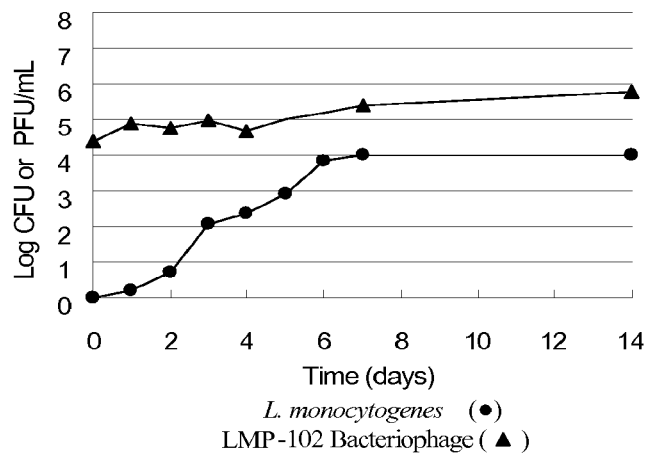
FIGS. 1A and 1B are log plots from Example 1 measuring levels of bacteriophage and *Listeria monocytogenes* (*L. monocytogenes*) in a hot dog broth over a fourteen day period. The initial bacteriophage density was higher in FIG. 1B, compared to FIG. 1A.

The term "food product(s)" is defined broadly herein as any substance that may be used or prepared for use as food. It includes, but is not limited to, processed or unprocessed food products, meat, meat-containing products, cheese, fruits and vegetables.

The term "raw agricultural commodity" includes any type of food that is in its raw or natural state. As defined in the Code of Federal Regulations (see 40 C.F.R. 180.1(d)), raw agricultural commodities include fresh fruits, whether or not they have been washed and colored or otherwise treated in their unpeeled natural form; vegetables in their raw or natural state, whether or not they have been stripped of their outer leaves, waxed, prepared into fresh green salads, etc.; grains, nuts, eggs, raw milk, meats, and similar agricultural produce. It does not include foods that have been processed, fabricated, or manufactured by cooking, freezing, dehydrating, or milling.

The term "meat product(s)" or "meat-containing product(s)" encompasses all forms of animal flesh, including, but not limited to, whole and parts of muscle, fat, organs, skin, and bones, and combinations thereof. Animal flesh includes, but is not limited to, the flesh of mammals, such as, for example, pigs, cows, sheep, and buffalo; birds, such as, for example, chickens, roosters, turkeys, ducks, geese, and other avian species; fish, such as, for example, salmon (including, but not limited to, cold smoked salmon), trout, and catfish; and shellfish, such as, for example, scallops, shrimp, crab, octopus, mussels, squid, and lobster. Preferably, the meat product is poultry, beef, pork, veal, buffalo, lamb, or sea food (e.g., scallops, shrimp, crab, octopus, mussels, squid, sushi, and lobster). The terms "bird" and "birds" are interchangeable with the term "poultry".

Typical forms of animal flesh include, but are not limited to, processed meats such as, for example, cured meats, sectioned and formed products, minced products, finely chopped products, and whole products. Exemplary processed meat products include, but are not limited to, ready-to-eat (RTE) foods, meat spreads (for example, pâtés), deli and luncheon meats, Lunchables®, hot dogs, sausage (for example, semi-fermented dry sausage), ground beef, ground pork, ground poultry, etc.

The term "contamination" encompasses bacterial growth, colonization, or infection, and any combination thereof, of bacterial pathogens. The bacterial pathogens include, but are not limited to, *Escherichia coli* including, but not limited to, *E. coli* O157:H7; *Listeria* including, but not limited to, *Listeria monocytogenes* (*L. monocytogenes*); *Clostridium* including, but not limited to, *Clostridium botulinum* and *Clostridium perfringens*, such as, for example, *Clostridium perfringens* Types A and C; *Streptococcus* including, but not limited to, *Streptococcus suis*, such as, for example, *Streptococcus suis* Types 1 and 2; *Mycoplasma* including, but not limited to, *Mycoplasma hyopneumoniae*; *Salmonella* including, but not limited to, *S. typhimurium*, such as, for example, *S. typhimurium* DT 104, *S. typhi-suis*, *S. cholerae-suis*, *S. enteriditis*, *S. Newport*, *S. Heidelberg*, *S. Kentucky*, *S. hadar*, and *S. Thomson; Serpulina* including, but not limited to, *Serpulina hyodystenteriae; Isospora* including, but not limited to, *Isospora suis; Eimeria* including, but not limited to, *E. acervulina*, *E. maxima*, and *E. tenella; Campylobacter* including, but not limited to, *Campylobacter jejuni; Chlamydia* including, but not limited to, *Chlamydia psittaci;*

*Enterobacter*, including, but not limited to, *E. sakazakii*; *Yersinia*, including, but not limited to, *Y. enterocolitica*; *Shigella*; *Bacillus*, including, but not limited to, *Bacillus cereus*; and *Staphylococcus*, including, but not limited to, *S. aureus*.

In a preferred embodiment, the bacterial pathogens are *E. coli* including, but not limited to, *E. coli* O157:H7, *Listeria monocytogenes*, *Clostridium perfringens*, such as, for example, *Clostridium perfringens* Types A and C, *Clostridium botulinum*, *Salmonella* including, but not limited to, *S. typhimurium*, such as, for example, *S. typhimurium* DT 104, *S. typhi-suis*, *S. cholerae-suis*, *S. enteriditis*, *S. Newport*, *S. Heidelberg*, *S. Kentucky*, *S. hadar*, and *S. Thomson*, *E. acervuline*, *E. maxima*, *E. tenella*, *Campylobacter jejuni* and *Chlamydia psittaci*.

Although the preferred bacteria are cited above, the pathogens are not limited to particular genera, species, and strains of bacteria. The bacterial pathogens present, or potentially present, on a food product will depend upon the particular food product being treated, as noted above. For example, *Salmonella* and *Campylobacter* species are most commonly found on poultry products, *E. coli* species are most common on beef products, *Listeria* species are most common in food products, such as, for example, cheese, and *Clostridium botulinum* strains are the most common sources of botulism in, for example, bacon, ham, smoked meat, smoked fish, and sausage.

The term "contamination" also encompasses spoilage bacteria, which include, but are not limited to, *Pseudomonas, Acinetobacter, Moraxella, Alcaligenes, Brochothrix, Burkolderia, Flavobacterium, Erwinia, Staphylococcus aureus, Shewanella, Enterococcus, Xanthomonas*, and lactic acid bacteria, including Lactobacilli.

Bacteriophage and Bacteriophage Cocktails

A bacteriophage (also known as and referred to herein as "phage") is a virus that infects bacteria. Commonly, a bacteriophage can infect only one or a few related types of bacteria. Bacteriophage are generally produced using a culture system. More specifically, host bacteria are cultured in batch culture, for example, followed by inoculation of the bacterial culture with an appropriate inoculum of bacteriophage. Following incubation, the bacteriophage are harvested and filtered to yield phage progeny. Lytic bacteriophages specific for pathogenic bacteria may be isolated by the methods described in U.S. Pat. No. 6,699,701. The same isolation methods may also be used to isolate bacteriophages specific for spoilage bacteria.

Suitable bacteriophage for use in the compositions and methods of the invention are bacteriophage effective in reducing or preventing bacterial contamination by bacterial pathogens and spoilage bacteria. Preferred bacteriophage that target pathogenic bacteria include, but are not limited to, bacteriophage specific for *Listeria monocytogenes, Listeria* spp., *Salmonella, Campylobacter* spp., *Enterobacter sakazakii, Yersinia enterocolitica*, Enterohemorraghic and Enteropathogenic strains of *Escherichia coli* (including *E. coli* O157:H7), *Shigella* spp., *Bacillus cereus, Staphylococcus aureus*, and *Xanthomonas* spp. Preferred bacteriophage that target spoilage bacteria include, but are not limited to, bacteriophage specific for *Pseudomonas, Acinetobacter, Moraxella, Alcaligenes, Flavobacterium*, lactic acid bacteria, *Erwinia, Staphylococcus aureus*, and *Xanthomonas* spp.

One or more bacteriophage may be used in the compositions and methods of the invention. Bacteriophage(s) may be selected using information about, for example, the type(s) of bacteria to be controlled, the reaction of potential bacteriophage(s) with the bacteria, the activity of the bacteriophage(s) against the target bacterial pathogen(s) in the host, and the stability of the various bacteriophage(s) in the host. One skilled in the art can readily determine the appropriate bacteriophage(s) to be included in the compositions of the invention by conducting testing, such as, for example, susceptibility testing. For example, *Salmonella* may be isolated from a source of contamination, such as a contaminated bird or environment thereof or feces found in a poultry farm or poultry processing plant. Susceptibility testing of the bacteria to various bacteriophage is performed by methods analogous to antimicrobial susceptibility testing, which is well-known in the art.

Once each bacterial pathogen's bacteriophage susceptibility profile is determined, a treatment comprising at least one bacteriophage to which the bacteria are susceptible can be formulated. Similarly, once a bacteriophage susceptibility profile has been determined for a spoilage bacteria, the treatment may be formulated. Preferably, the treatment comprises more than one bacteriophage to which the bacteria are susceptible (i.e., a "cocktail"). A bacteriophage cocktail may include bacteriophage for both pathogenic and spoilage bacterium. The cocktail preferably is capable of killing more than one bacterial strain within the target genus of pathogens and/or reduces the ability of the bacterial pathogens to develop resistance to bacteriophage infection. The members of the bacteriophage cocktail can be substituted as needed to minimize risk of resistance developing.

Bacteriophage cocktails contain at least two bacteriophages and are preferably custom-tailored to the bacterial pathogens or spoilage bacteria that are prevalent on a particular food product or non-food surface. For example, a bacteriophage cocktail may be applied to a surface, such as a counter in a meat deli, that may be susceptible to more than one type of bacteria. The members of the bacteriophage cocktail can be substituted as needed to, for example, minimize the resistance developing. A bacteriophage treatment may include bacteriophage that target more than one pathogenic bacteria or more than one spoilage bacteria, or combinations of pathogenic and spoilage bacteria.

The preferred delivery vehicle for the bacteriophage composition depends on the manner of application, as described in further detail below. The bacteriophage may be provided in aqueous or non-aqueous environments for treating food products, non-food surfaces and water systems. Aqueous compositions comprise at least one bacteriophage and a suitable carrier, including, for example, a buffer, such as, for example, phosphate buffered saline, Luria-Bertani Broth, and chlorine-free water. Non-aqueous compositions include, but are not limited to, lyophilized compositions or spray-dried compositions comprising at least one bacteriophage. The composition may be a suspension, coating or in tablet, capsule or powder form. More than one delivery vehicle, or carrier, may be used.

The bacteriophage treatment may be formulated as a concentrate composition or a ready-to-use composition. A concentrate composition is often less expensive to ship and easier to store than a ready-to-use composition. The concentrate refers to the composition that is intended to be diluted to form the ready-to-use composition. The ready-to-use composition refers to the composition that is intended to be applied to the food product or non-food surface.

The concentration of bacteriophage employed may be determined using phage titration protocols. The concentration of bacteriophage varies depending upon the carrier and method of administration. In one embodiment, the bacteriophage concentration may range from about $10^5$ to about $10^{11}$ Plaque Forming Units (PFU)/milliliter (ml). In a more preferred embodiment, the bacteriophage concentration ranges from about $10^7$ to about $10^{11}$ PFU/ml. After dilution with buffer, a final concentration of bacteriophage may yield a phage titer ranging from about $10^6$ to about $10^9$ PFU/ml. This final concentration is for the ready-to-use composition.

A bacteriophage composition may be freeze-dried or spray-dried for storage, if desired. Upon reconstitution, the phage titer can be verified using phage titration protocols and host bacteria. One of skill in the art would be capable of determining bacteriophage titers using widely known bacteriophage assay techniques (Davis et al., *Microbiology*, 3$^{rd}$ Ed., Harper & Row, Hagerstown, Md. (1980), pp. 874-877, 880-883).

Adjuvants and Other Optional Components

The bacteriophage treatment may include any suitable adjuvant, such as adjuvants designed to stabilize the bacteriophage and/or improve the performance of the bacteriophage treatment. The adjuvants may be part of the concentrate containing the bacteriophage or they may be added to the ready-to-use composition. Alternatively, a two-part concentrate may be used in which a first concentrate contains the at least one bacteriophage and a second concentrate contains adjuvants and other product-enhancing components. The particular adjuvants included in a bacteriophage treatment depend, in part, on what the treatment is being applied to and the mode of dispensing and delivering the treatment, both of which are described below.

In some embodiments, the bacteriophage treatment includes a surfactant, which enables the aqueous solution to wet and spread over the skin. For purposes of this disclosure, a surfactant is broadly defined as any substance that reduces the surface tension of the aqueous composition. The surfactant may include any type of foaming surfactant, nonionic, anionic or cationic surfactant. Examples of suitable foaming surfactants are listed below under the Dispensing and Delivery section. The surfactant also may include any type of wetting surfactant, including, but not limited to, block copolymers such as Pluronics® from BASF, as well as reverse pluronics. A suitable concentration of the surfactant in the bacteriophage treatment is between approximately 25 ppm and approximately 2.0 weight percent.

The bacteriophage treatment may, in some embodiments, include a thickener to improve contact and adherence of the treatment with the surface to which the treatment is being applied. Thickeners may be of particular significance for application of the bacteriophage treatment to a vertical surface, as described below. Any known thickeners may be used, including, but not limited to, xanthan gum, polymeric thickeners, cellulose thickeners, and rod-micelle forming systems. An example of a suitable cellulose thickener is carboxymethyl cellulose. Rod-micelle forming systems include, but are not limited to, amine oxides and anionic counter ions. A suitable concentration of the thickener in the bacteriophage treatment is between about 100 ppm and about 10 weight percent. The concentration of the thickener may depend in part on the desired viscosity of the bacteriophage treatment.

A protectant system may also be included in some embodiments of the bacteriophage treatment in order to protect viability of the bacteriophage. The protectant system may generally include adjuvants known to stabilize the bacteriophage such that the bacteriophage remains viable to attack and eliminate target bacterial strains. For example, the protectant system may include a buffering agent that controls a pH level of the bacteriophage treatment in order to sustain the bacteriophage in the aqueous solution. A suitable pH range for the bacteriophage treatment is between approximately 4 and 9. The protectant system may also include metallic salts and/or salts of gluconic acid. Suitable metallic salts include, but are not limited to, those having a divalent cation, such as calcium and magnesium.

In some embodiments, the bacteriophage treatment may be prepared, but not applied for a period of time. In a preferred embodiment, the ready-to-use composition is not prepared until shortly before applying the bacteriophage treatment, and thus the concentrate composition may be stored for some period. In either case, the bacteriophage treatment may include adjuvants to preserve and stabilize the phage such that the bacteriophage is still active when it is later applied. For example, in embodiments in which the bacteriophage treatment is freeze dried or stored as a pellet or powder, glycerol or propylene glycol may be used to maintain viability of the bacteriophage and prevent the bacteriophage treatment from drying out.

As described in detail below, the bacteriophage treatment is well-suited for packaged food applications. The bacteriophage treatment is applied to the food product and/or to the packaging that the food product is to be stored in. Adjuvants, including those described above, may be used to preserve the bacteriophage treatment inside the packaging. The protectant system may include additional components including, but not limited to, barrier films and light blocking films. In some cases, so long as the bacteriophage is preserved, the food product may be contaminated with bacteria after the packaging has been opened, and the bacteriophage may still be effective at reducing or eliminating bacteria. In alternative embodiments, a deactivating component may be used to inactivate the bacteriophage at a predetermined time. The deactivating component may be part of the bacteriophage treatment and/or part of the packaging.

It is recognized that additional adjuvants not explicitly described herein may be used with the bacteriophage treatment to improve stability and/or performance of the bacteriophage.

Dispensing and Delivery

The bacteriophage treatment may be dispensed and delivered using any known dispensing mode and delivery mode. The particular mode may depend, in large part, on the particular application. The bacteriophage treatment may be applied to essentially any type of food at generally any stage during processing, provided that the bacteriophage is not inactivated or killed by the food processing steps. The bacteriophage may be applied to raw agricultural crops. The bacteriophage also may be applied to non-food surfaces and water systems.

To be effective at reducing or preventing bacterial contamination, the treatment should have a sufficient concentration (as described above) and there should be adequate coverage of the bacteriophage treatment on the food or non-food product. For example, in an exemplary embodiment, approximately 1 milliliter of an aqueous bacteriophage treatment may be applied to a surface area of approximately 300 to 700 cm$^2$. In preferred embodiments, coverage of the bacteriophage is approximately 1 milliliter per 500 cm$^2$. An application mode that is well-suited for a fatty food product (for example, beef) may not be well-suited for a waxy food product (for example, produce). Non-food surfaces, particularly vertical surfaces, may require thickening agents to promote adherence of the treatment to the surface.

If the bacteriophage treatment comprises more than one bacteriophage, the members of the bacteriophage cocktail may be applied at the same time, i.e., in the same application, or they may be applied in separate applications spaced in time.

For food applications, the bacteriophage can be applied to any part of the food product or to the whole food product by any effective mode of application, including, but not limited to, air chilling, submersing (e.g., dipping or soaking the food product in a solution containing a concentration of bacteriophage), rinsing, coating, spraying or misting the bacteriophage on the food product, and adding, injecting, or inserting the bacteriophage into the food product, or any combination thereof. Spray applications may include electrostatic spraying. Devices used to apply the bacteriophage include, but are not limited to, sprayers, foggers, foamers, foam pad applicators, and brush applicators.

In general, submersion requires immersion into a tank containing a quantity of washing solution, which includes a bacteriophage. The washing solution is preferably agitated to increase efficacy of the solution and the speed in which the solution reduces the level of bacteria. Agitation can be obtained by conventional methods, including, but not limited to, ultrasonics, aeration by bubbling air through the solution, mechanical methods, such as, for example, strainers, paddles, brushes, and pump driven liquid jets, or combinations thereof.

For both food and non-food applications, the bacteriophage treatment may be applied as a foam. The foam can be prepared, for example, by mixing foaming surfactants with the bacteriophage at the time of use. The foaming surfactants can be nonionic, anionic, or cationic in nature. Examples of useful surfactants include, but are not limited to, alcohol ethoxylates, alcohol ethoxylate caroxylate, amine oxides, alkyl sulfates, alkyl ether sulfate, sulfonates, quaternary ammonium compounds, alkyl sarcosines, betaines, and alkyl amides. A suitable concentration of the foaming agent is between about 25 ppm and about 2.0 weight percent. At the time of use, air can be injected into the bacteriophage composition, then applied to the food product surface through a foam application device, such as, for example, a tank foamer or an aspirated wall mounted foamer.

The bacteriophage treatment also may be applied to food or a non-food surface as a gel or a thickened solution. In the thickened or gelled state, the bacteriophage remains in contact with the food or non-food surface for a longer period, thus increasing the efficacy of the bacteriophage. The thickened or gelled solution may be used to improve adherence of the bacteriophage to vertical surfaces. Any known thickener, including those listed above, may be used, so long as it is compatible with the bacteriophage. The thickeners or gel forming agents can be used either in the concentrated product or added during preparation of a ready to use treatment. Typical concentrations of thickeners or gel agents range from about 100 ppm to about 10 weight percent. Thickeners useful in the present invention are those which do not leave a contaminating residue on the surface of application. Generally, the concentration of thickener used is dictated by the desired viscosity of the final composition. Thickener ranges from about 0.1 weight percent to about 1.5 weight percent are suitable, from about 0.1 to about 1.0 weight percent are preferred, and from about 0.1 to about 0.5 weight percent are more preferred.

The bacteriophage treatment may be applied to a food or non-food surface via a pressure spray. During application of the spray solution on the surface of a food product, the food product can be moved with mechanical action, e.g., agitated, rubbed, brushed, etc. Application of the bacteriophage by spray means can be accomplished using a manual spray wand application. Alternatively, an automatic spray wand may be used to apply the bacteriophage treatment as a food product moves along a production line. In some designs, multiple spray heads may be used to ensure complete contact.

One preferred automatic spray application involves the use of a spray booth. The spray booth substantially confines the sprayed composition to within the parameter of the booth. The production line moves the product through the entryway into the spray booth in which the product is sprayed on all its exterior surfaces within the booth. After a complete coverage of the material and drainage of the material from the product within the booth, the product can then exit the booth in a fully treated form. The spray booth can comprise steam jets that may be used to apply the bacteriophage treatment. In some embodiments, these steam jets can be used in combination with cooling water. A spray booth may primarily be used for food products or non-food products (for example, a slicer) which are passable through the spray booth.

The bacteriophage treatment may also be applied to agricultural crops or citrus trees. The treatment may be applied through fertilizer or as part of a pesticide. The treatment may be applied through water (i.e. irrigation water). A manual or automatic spray application may be used. Given the large volumes, it may be preferred to use automatic sprayers.

In some embodiments, the spray may optionally comprise a fogged material that leaves a fogging apparatus as a dispersion of fog particles in a continuous atmosphere. Such a spray has no defined pattern. Alternatively, the spray may have a pattern, such as, for example, a conical spray in which the angle between the perimeter of the spray ranges from less than about 180° to about 5°. Other spray patterns may also be used. One preferred spray pattern involves a "fan" spray pattern in which the spray exits the spray head in a substantially planar form and the angle between the extent of the planar spray from edge to edge is about 20° or less, preferably, about 15° or less. When a narrow angle fan spray is used in a spray cabinet enclosure to treat a food product, the optimum distance between the spray head and the food product is less than about 100 centimeters, preferably, about 20 to about 80 centimeters, and most preferably, about 30 to about 50 centimeters. Such a configuration efficiently transfers bacteriophage to the product for efficient reduction of the bacterial population or efficient prevention of bacterial growth.

For packaged food applications, the bacteriophage may be dispensed or applied directly to the food and/or directly to the packaging. In those cases in which the bacteriophage treatment is applied directly to the food, any of the delivery methods described above are applicable. To apply the bacteriophage treatment to the packaging, the bacteriophage treatment may be, for example, sprayed onto an inside portion of the packaging. In some embodiments, the bacteriophage may be part of the packaging material, and the bacteriophage may be released at a predetermined time or under specific conditions. For example, the bacteriophage may be suspended in the packaging film. Moisture from the food product releases or solubilizes the bacteriophage, thus causing the bacteriophage to contact the food product. Alternatively, a dried phage preparation may be contained in a moisture adsorbent pad that is used in packaging for ready to eat (RTE) meat and other raw food articles. Purge water from the food product solubilizes or releases the phage.

Combination Treatments

Treatment of a food product using bacteriophage may optionally be combined with other methods of reducing or preventing bacterial contamination on food products. For example, the commonly used method of bacterial competitive exclusion may be employed. Competitive exclusion bacteria can be applied directly to the food product before, during, or after bacteriophage treatment. For example, one embodiment of the combination method is directed to a method for reducing Salmonella in poultry products, comprising, in any order, (1) applying a defined culture of microorganisms which are antagonistic to Salmonella to the surface of the poultry product; and (2) applying a specific Salmonella bacteriophage mixture. The competitive exclusion bacteria would desirably reduce or prevent growth of bacteria not affected by the bacteriophage.

Bacteriophage may be combined with irradiation to control pathogens on food products. The food product can be exposed to an activating light or other electromagnetic radiation source following application of the bacteriophage. The activating light or other electromagnetic radiation can improve the antibacterial efficacy of the bacteriophage. The light can be ultraviolet light, infrared light, visible light, or a combination thereof. Other forms of electromagnetic radiation include, but are not limited to, radiofrequency (RF) and microwave. Thus, one may reduce or prevent bacterial contamination by applying a pathogen specific bacteriophage, such as, for example, Listeria monocytogenes, to the food product, followed by irradiating the food product at a level sufficient to inactivate the bacterial pathogens without affecting phage integrity or infectivity.

Bacteriophage can be combined with peroxyacids. For example, in a process for reducing or preventing the growth of bacterial pathogens, such as, for example, Salmonella, Campylobacter, and E. coli, on fresh or frozen poultry, the combination treatment comprises (1) treating the carcasses during a washing step with peroxyacids followed by (2) treating the carcasses with chiller water comprising peroxyacids, and (3) post chilling the carcasses, bird parts, and bird organs with spray or immersion in a pathogen specific, i.e. Salmonella, Campylobacter, and E. coli, bacteriophage cocktail. Similarly, in a process for reducing bacterial contamination on red meat carcasses, the combination treatment comprises washing the carcasses in a peroxyacids carcass wash, followed by chill spray treating of the carcasses with a pathogen specific, i.e., Salmonella, Campylobacter, and E. coli, bacteriophage cocktail.

Other examples of combination treatments include, but are not limited to, using the bacteriophage treatment with bacteriocins or bacteriocin producing organisms to provide a multiple intervention approach. Other combination treatments include octanoic acid and other fatty acids, terpenes or terpenoids. The bacteriophage treatment also may be used with a pesticide for environmental control of pathogens. It is recognized that additional bacteria reduction methods not specifically described herein may be used in combination with a bacteriophage treatment.

Applications

The bacteriophage treatment described herein may be used in a variety of applications to reduce and eliminate particular strains of bacteria. The applications described below are exemplary embodiments and it is recognized that the method and system described herein is not limited to the specific applications described below.

Food Products

The bacteriophage treatment may generally be used on any type of food product, and during any stage of food processing. As described above, the bacteriophage treatment may include at least one bacteriophage selected from a group of known bacteriophages that target pathogenic bacteria and/or spoilage bacteria.

Listeria monocytogenes (L. monocytogenes) is a pathogenic bacterium that commonly occurs in both agricultural and food processing environments. L. monocytogenes is able to grow at low oxygen conditions and refrigeration temperatures. L. monocytogenes is commonly associated with RTE meats and poultry (raw and cooked); however, contamination has also been observed in frankfurters (hot dogs), cheese, shrimp, raw meats, raw and smoked fish, and milk. In the Examples section below, a test study demonstrates that a bacteriophage composition is capable of reducing populations of L. monocytogenes on a surface of ready to eat (RTE) foods. Other common bacterium associated with food, particularly red meat and poultry, include Campylobacter, E. coli and Salmonella.

In some embodiments, the bacteriophage treatment includes a buffering agent to control a pH level of the composition in order to maintain the bacteriophage in its preferred environment. An appropriate pH level is between approximately 4 and 9.

It is important that the bacteriophage treatment is able to spread and adhere to the food product. Surfactants and/or thickening agents may be used to aid in application of the bacteriophage to a surface of the food product. As described above, for purposes of this disclosure, a surfactant is defined broadly and may include wetting agents, as well as foaming agents. An appropriate concentration of the surfactant for food applications is between approximately 25 ppm and 2.0 weight percent. A surfactant may used to aid in spreading the bacteriophage treatment across the surface of the food product. The particular surfactant selected may depend in part on the type of food surface that the bacteriophage is being applied to.

A thickening agent may be used to thicken the bacteriophage treatment. A thickened composition may more easily adhere to the food surface and increase contact time between the bacteriophage and the food. Any type of thickener or gelling agent may be used. A concentration of the thickener or gelling agent in the bacteriophage treatment may depend in part on a desired viscosity of the bacteriophage composition. A suitable concentration of thickener in the bacteriophage treatment is between approximately 100 ppm and approximately 2.0 weight percent.

For food applications, the bacteriophage treatment may be applied to a food product using any known delivery technique, as described above, so long as there is adequate coverage of the bacteriophage. The bacteriophage treatment may commonly be applied to the food product after the food product has been processed. For example, in the case of deli meat, the bacteriophage treatment may be applied after the meat has been sliced and prior to putting the sliced meat in a deli case. Alternatively, the phage treatment may be applied to the unsliced meat before the meat is shipped to a processing facility. In some embodiments, a bacteriophage treatment may be applied to a food product multiple times during processing, as described immediately below.

The main steps in poultry processing are described herein as an example to illustrate the various stages at which a bacteriophage treatment may be applied to a food product. Processing typically begins with sacrificing the bird, generally by electrical stunning, followed by neck cutting and bleeding. A first washing step, known as scalding, e.g., submersion or immersion scalding, typically follows bleeding and loosens attachment of feathers to poultry skin.

After submersion scalding, the poultry is typically picked and, optionally, singed before the next washing process. The second washing process, generally known as "dress" rinsing, "New York dress" rinsing, or post-pick rinsing, removes residual feathers and follicle residues from the carcass. Dress rinsing includes, but is not limited to, spraying a picked carcass with water, typically at a temperature of about 5 to about 30° C. A bacteriophage treatment may be added to the water that is to be sprayed on the carcass. To increase contact with the carcass, the bacteriophage in the spray water can be applied at higher pressures, flow rates, or temperatures, or with agitation or ultrasonic energy. Dress rinsing is typically accomplished with a washing apparatus, such as, for example, a wash or spray cabinet with stationary or moving spray nozzles. Alternatively, a "flood"-rinsing or liquid submersion washing apparatus may be used immediately after picking.

Dress rinsing is often a final washing step before dismembering and eviscerating the bird. The dismembered and eviscerated bird can then be subjected to a washing step known as inside-outside bird washing (IOBW), which washes the interior (body cavity) and exterior of the bird.

After IOBW, the carcass is prepared for packaging or for further processing by chilling, specifically, submersion chilling or air chilling. Submersion chilling both washes and cools the carcass to retain quality of the meat, and includes, but is not limited to, submersing the carcass completely in water or slush, typically at a temperature of less than about 5° C., until the temperature of the carcass approaches that of the water or slush. Chilling the carcass can be accomplished by submersion in a single bath or in two or more baths, each at a lower temperature. Water can be applied with agitation or ultrasonic energy to increase contact with the carcass. Bacteriophage also may be added to the chiller water. Submersion chilling is typically accomplished by an apparatus, such as, for example, a tank containing the chilling liquid with sufficient liquid depth to completely submerse the poultry carcass.

Like submersion chilling, air chilling (also known as air cooling or cryogenic chilling) cools the carcass to retain quality of the meat. Air chilling can be less effective for decontaminating the carcass, as air typically does not dissolve, suspend, or wash away contaminants. Air chilling with a gas, including an antimicrobial agent can, however, reduce the burden of microbial, and other, contaminants on the bird and thus, could be combined with the bacteriophage treatment applied in an earlier stage.

After chilling, the carcass can be subjected to additional processing steps including, but not limited to, weighing, quality grading, allocating, portioning, and deboning. These later processing steps also may benefit from a bacteriophage treatment. For example, portioning the bird into legs, breast quarters, wings, thighs, etc. forms or reveals new meat, skin, and/or bone surfaces which may be subject to bacterial contamination and thus, benefit from treatment with bacteriophage. Similarly, deboning a poultry carcass can expose additional areas of the meat or bone to bacterial contamination. Treating the deboned poultry carcass with a bacteriophage can advantageously reduce any such contamination. Bacteriophage application can be accomplished by spraying, immersing, tumbling, or a combination thereof.

Usable side products of poultry include, but are not limited to, the heart, liver, and gizzard, e.g., giblets, and neck. These are typically harvested later in processing, and are sold separately. Typically, the side products are washed after harvesting from the poultry carcass and before packaging. They can be washed with bacteriophage by submersing, spraying, or transporting in a flume including the bacteriophage, or through contact in a giblet chiller or ice chiller.

The above description refers to poultry and poultry products which can be treated at least once with bacteriophage at any stage or at a combination of stages. One skilled in the art could readily determine the corresponding procedures for preparing other meat and meat products and other food products, such as, for example, cheese and fish. In general, the food products are prepared as routinely prepared in the art and the bacteriophage added before, during, and/or after at least one step of the preparation.

For non-meat food products, in some embodiments, the bacteriophage treatment may be applied to a food product while the food product is still being grown or prior to harvesting. At this point, the food product is defined as a raw agricultural commodity and remains a raw agricultural commodity until it undergoes processing. As an example, a bacteriophage treatment may be sprayed onto a crop of lettuce. It may be sprayed on manually or using an automated device. Known systems for irrigating and/or treating crops may be used for applying a bacteriophage treatment. Other examples of raw agricultural commodities which may receive a bacteriophage treatment during development include leafy greens, melon, sprouts, spinach, lettuce, tomatoes, and citrus fruit.

A bacteriophage treatment may be applied to citrus trees to prevent citrus canker, which is caused by the bacteria *Xanthomonas axonopodis*. The bacteria result in the development of lesions on the leaves, steams and fruit of the citrus trees. In a preferred embodiment, an automated dispensing device would be used to ensure adequate coverage of the bacteriophage treatment on all of the trees.

In summary, the bacteriophage treatment described herein may be applied to essentially any type of food product at any stage during development or processing of the food product.

Packaged Food Products

As stated above, the bacteriophage treatment is well-suited for packaged food products. Packaged food products may include any food item that is packaged temporarily (for example, during transportation to a deli or to a supermarket) or any food item that is intended to be packaged until it is opened by the consumer. These packaged food products may include, but are not limited to, bagged salads, bagged vegetables, bagged fruit, cheese and meat.

Food products suitable for the bacteriophage treatment described herein may be packaged in numerous ways including vacuum packaging, shrink wrapping and modified atmosphere packaging. The products may be packaged in a variety of packaging materials including bags, pouches, films such as shrink film and non-shrink films, trays, bowls, clam shell packaging, web packaging, and hot dog/frankfurter packaging.

The bacteriophage treatment may be applied before, after, or at the time of packaging of the food product. The phage may be applied after the food product is in the package, but before the package is sealed or otherwise closed. The bacteriophage treatment may be applied directly to the food product, indirectly to the food product (i.e. by applying to the packaging), or both. If the bacteriophage treatment is applied directly to the food product, then it is preferable that the bacteriophage treatment be applied to the food product essentially immediately before packaging.

The bacteriophage may be part of the packaging. For example, the bacteriophage may be suspended in the packaging film. Moisture content of the food product may release or solubilize the bacteriophage such that the phage then contacts the food product. In another example, a dried phage preparation may be contained in a moisture adsorbent pad commonly used in packaging of ready to eat and raw food articles. Similarly, purge from the food product solubilizes or releases the bacteriophage from the pad.

In some embodiments, an optional component that acts as a deactivating component may be used to inactivate the bacteriophage at a predetermined time after placing the food product in the packaging. The predetermined time may be based on an estimation of when the bacteriophage may have reduced or eliminated the majority of any bacteria inside the packaging. Examples of deactivating components include one or more strains of non-pathogenic bacteria that degrade bacteriophage, whether by release of nucleases or proteases, or another mechanism. An example is a lactic acid bacteria. Other examples of deactivating components include controlled release enzymes (nucleases and/or proteases), controlled low-level chlorine releasing agents, encapsulated enzymes or organic acids that may be released upon hydration inside the packaging, oxychloro species releasing agents, and peroxyacids. These materials may be part of the bacteriophage treatment that is applied to the food and/or the packaging. Alternatively, these materials may also be incorporated into the packaging itself. Inactivation of the bacteriophage may be preferred in some applications since packaged food products containing a bacteriophage may require labeling directed at a virus contained within the packaging.

As supported by another test study described below (see Example 3), if a packaged food product is contaminated after the bateriophage treatment is applied, the bacteriophage may still be able to reduce or eliminate the bacteria introduced after the bacteriophage was applied. The bacteriophage is applied to a food product to eliminate any bacteria on the food product at the time of application. However, after the bacteriophage application, the food product may still be susceptible to bacteria contamination, after the packaging is opened. For example, a meat product may be exposed to bacteria at a processing facility, and the bacteriophage treatment may be applied to the meat product before it leaves the processing facility. However, the meat product may be exposed again to bacteria and contaminated a second time, for example, at the deli when the meat product is being sliced. The bacteriophage may be able to reduce the bacteria introduced to the meat product at the deli, even though the bacteriophage was applied to the meat product prior to contamination at the deli. As another example, a consumer may buy presliced, prepackaged deli meat that is refrigerated until use. At a later date that is within the shelf life of the meat, the consumer may open the package to use some, but not all of the meat. If the meat is taken out of the package, in some cases, the meat may become contaminated with bacteria prior to placing the unconsumed meat back into the refrigerator. The bacteriophage treatment described herein may be able to reduce the bacteria introduced to the meat after the packaging is opened, so long as the bacteriophage from the original bacteriophage treatment is still active.

The test study in Example 3 illustrates that if the food product is contaminated with *L. monocytogenes* three or seven days after the bacteriophage treatment, the bacteriophage is able to reduce the population of *L. monocytogenes*. This extended activity of the bacteriophage is a significant benefit at both the consumer level and for food processing facilities. The extended activity of the bacteriophage is dependent on maintaining the viability of the bacteriophage throughout the shelf life of the food product. As shown in the test study in Example 2 below, populations of bacteriophage applied to food products remained stable over a fourteen day refrigeration period. The bacteriophage should remain viable up to 14 days after the packaged food product is first opened, provided that the food product is refrigerated before and after opening of the packaging.

A protectant system may be used to protect the viability of the bacteriophage during the shelf life of the packaged food product to which the bacteriophage is applied. In some cases, the packaging method used to package the food product may be sufficient to maintain the bacteriophage. For example, as described above, food products may be packaged using vacuum packaging, shrink wrapping and modified atmosphere packaging, all of which are designed to maintain low oxygen levels inside the packaging where the food product is stored. An ultraviolet (UV) light blocking film or a barrier film may be used. The protectant system also may include metallic salts or salts of gluconic acid, both of which are designed to protect the bacteriophage. The metallic salts are preferably formed from metals with divalent cations, including, but not limited to, calcium and magnesium. These salts may be part of the bacteriophage treatment or a separate composition containing the salts may be applied at the same time or separately from application of the bacteriophage treatment. As described above, a buffering agent may also be used to maintain the bacteriophage treatment at an optimal pH level for the bacteriophage. It is recognized that the various components described herein for the protectant system may be used individually or in combination.

Non-Food Surfaces

The bacteriophage treatment described herein may also be used for non-food surfaces. Equipment used for food processing, as well as the surrounding areas, may commonly be a source of bacterial contamination. The bacteriophage treatment may be applied to virtually any non-food surface provided that the bacteriophage is delivered in a manner to ensure proper contact between the bacteriophage and the surface. The bacteriophage may be applied, for example, to any of the equipment in a deli, such as meat slicing equipment, including a blade. The phage also may be applied to floors, walls, sinks and drains of the deli.

The bacteriophage may be applied using any of the delivery methods described above, so long as the bacteriophage adequately covers and adheres to the intended surface. In some cases, the bacteriophage may be applied as a thickened composition. If the bacteriophage is to be applied to a generally vertical surface, it is preferred that a thickened bacteriophage treatment be used. Thickeners or gel forming agents may be used to create the thickened composition. An appropriate concentration of the thickening agent is between approximately 100 ppm and 10 weight percent. In a preferred embodiment, the concentration of the thickening agent is between approximately 100 ppm and 2.0 weight percent.

In other embodiments, the bacteriophage treatment may be applied as a foam to the surface. In that case, a foaming surfactant may be used at a concentration ranging between approximately 25 ppm and approximately 2.0 weight percent. The bacteriophage also may be sprayed onto the surface.

The non-food surfaces may also include, but are not limited to, floor drains, sink drains, drip pans, cooler floors and walls, refrigerated cases, deli counters, deli walls, deli floors, fork lifts, carts, tanks and tubs. The bacteriophage may also be added to any type of processing equipment or handling equipment used in the food or beverage industry. The machinery in the food and beverage industry may commonly use food-grade greases, which may be treated with a bacteriophage treatment. In other examples, red meat chill sprays and brine chill systems may also be treated with a bacteriophage treatment.

By applying the bacteriophage to the equipment and other surfaces that the food may directly or indirectly come into contact with, the bacteriophage has a potential to greatly reduce the spread of bacteria in a food processing or handling facility. Moreover, the bacteriophage could be used at a consumer level as well. For example, a spray bottle may be used to spray the bacteriophage on kitchen counters and in sinks, stoves, ovens, refrigerators, etc.

Water Systems

The bacteriophage treatment may also be added to a water system, and in some cases, may be used to prevent cross-contamination. The water system may include, but is not limited to, livestock drinking water, poultry chiller water, hydro-coolers, brine coolers or chillers, and flumes for fruits and vegetables.

For use in a water system, the bacteriophage may be available in several forms, including, but not limited to, a liquid, a tablet or a powder. Any of these forms may be added directly to the water system. Alternatively, it may be preferred to premix and dilute the concentrate before adding it to the water system, in which case other components may easily be added to the bacteriophage treatment during dilution. The other components may include a buffering agent to control a pH level and/or other adjuvants mentioned above. In an alternative embodiment, the buffering agent and other adjuvants may be part of the concentrate, whether it is a liquid concentrate, a tablet or a powder.

The bacteriophage treatment may be added to the water system either manually or automatically. A control system may be used to monitor a concentration of bacteriophage in the water system to ensure that an effective concentration of the bacteriophage is maintained. The control system may be configured such that a replenishment bacteriophage is added to the water system periodically as a function of time, or based on sensed parameters within the water system. The control system may also monitor a pH of the water system to ensure that the water system is maintained at a pH range that ensures viability of the bacteriophage. In some embodiments, a pH buffering agent may be added to the water system prior to or essentially simultaneous to adding the bacteriophage to the water. The monitoring system may be configured to introduce additional buffering agent into the water as necessary to maintain the pH levels.

Treating the water with a bacteriophage creates another opportunity to reduce bacterial contamination. Food products benefit from using the water treatment in combination with applying the bacteriophage directly to the food product. For example, in poultry chiller water, there is the potential for a first piece of poultry to contaminate the water; then, when a second piece of poultry is placed in the water, the second piece of poultry may become contaminated. By eliminating the bacteria in the water from the first piece of poultry, the bacteriophage has the potential to stop the spread of bacteria during the processing steps. In the case of poultry, a poultry carcass may undergo several bacteriophage treatments, as described above, and using a bacteriophage in the chiller water is one example.

In another example, cleaning of fruits and/or vegetables may involve placing the fruits or vegetables in a flume of water. Similar to the poultry chiller water, the flume may easily facilitate the spread of bacteria. However, by treating the water in the flume with the bacteriophage, it is possible to reduce or eliminate bacteria in the flume. Moreover, the bacteriophage treatment of the flume may be used in combination with other bacteriophage treatments for fruits and vegetables. As described above, these may include any of spraying the crops with a bacteriophage treatment prior to harvest, spraying the fruits and vegetables before shipping to a retailer, and/or spraying the fruits and vegetables during or after stocking at the retail store.

Although specific applications for a water system are described above, it is recognized that the bacteriophage treatment may be applied to essentially any water system having a potential for bacterial contamination.

EXAMPLES

Example 1

The purpose of the test study defined as Example 1 was to evaluate the stability of LMP-102™ bacteriophage in hot dog broth, and to determine a dosage of LMP-102™, relative to *L. monocytogenes*, that is effective at suppressing the growth of *L. monocytogenes* in the hot dog broth. (Plaque Forming Units (PFU) of LMP-102™ were measured and compared to Colony Forming Units (CFU) of *L. monocytogenes*.) The test conditions in Example 1 were intended to provide optimal conditions for the survivability of the bacteriophage and optimal conditions for reducing *L. monocytogenes*.

Five strains of *L. monocytogenes*, including Lis-300 (Serotype 1/2c), Lis-301 (Serotype 1/2a), and Lis-302 (Serotype 4b) (field isolates), Lis-253 (ATCC 35152, Serotype 1/2b), and Lis-254 (ATCC 13932, Serotype 4b), were used. The strains were maintained on Brain Heart Infusion Agar slants at 4±1° C.

Each strain was grown separately in 10 ml 2% (wt/vol) hot dog broth (HDB) for 24 h at 37° C. At least three, but no more than fifteen, 24-hour loop transfers at 37° C. were performed. HDB was prepared by adding 2% (wt/vol) hot dog to MilliQ water, homogenizing in a lab blender on high for 1 minute, filtering through cheesecloth, and autoclaving. Two milliliters from each suspension were transferred to a sterile tube and mixed by vortexing.

The suspensions was diluted appropriately in sterile 2% HDB, to obtain three 200-mL suspensions of approximately $10^0$, $10^2$, and $10^4$ CFU/mL in 500-mL pyrex bottles. Six replicates of each dilution were prepared. Four bottles containing no *L. monocytogenes* were included. Thus, four different concentrations of *L. monocytogenes* were distributed among 22 bottles (1—zero CFU/ml; 2—$10^0$ CFU/ml; 3-$10^2$ CFU/ml; and 4-$10^4$ CFU/ml).

LMP-102™, a mixture of six monophages that target *L. monocytogenes*, was produced by Intralytix, Inc. at the Warehouse at Camden Yards, 323 West Camden Street, Baltimore, Md., 21201. Aliquots of 0.1 ml of a dilution of LMP-102™ were added to the bottles at two different phage densities. Half of the eleven bottles had an initial phage density of approximately $4\times10^4$ PFU/mL; the other half of the eleven bottles had an initial phage density of $3\times10^6$ PFU/mL. The bottles were mixed vigorously after adding LMP-102™. Table 1 below shows the composition of the various samples.

TABLE 1

| Sample ID | Number of Bottles | L. monocytogenes Initial Target CFU/mL | LMP-102 Initial Target PFU/mL |
|---|---|---|---|
| A | 3 | $10^0$ | $4 \times 10^4$ |
| B | 3 | $10^0$ | $3 \times 10^6$ |
| C | 3 | $10^2$ | $4 \times 10^4$ |
| D | 3 | $10^2$ | $3 \times 10^6$ |
| E | 3 | $10^4$ | $4 \times 10^4$ |
| F | 3 | $10^4$ | $3 \times 10^6$ |
| G | 2 | Not inoculated | $4 \times 10^4$ |
| H | 2 | Not inoculated | $3 \times 10^6$ |

The bottles were stored static at 5±2° C. for up to 14 days. Colony forming units (CFU) and plaque forming units (PFU) were analyzed at 0, 1, 2, 3, 4, 5, 6, 7, and 14 days following inoculation with *L. monocytogenes* and introduction of the bacteriophage, LMP-102™. The populations of *L. monocytogenes* in suspensions were determined by serial dilution of HDB following vigorous mixing in phosphate buffered dilution water (PBDW) and pour plating in tryptone glucose extract (TGE) agar. Plates were incubated at 37±2° C. for 48±4 h.

Bacteriophage in suspensions were enumerated by filtering 2.5 mL from each bottle, following vigorous mixing, through a 0.45 μm filter membrane (Pall Gelman, Acrodisc, #4614) via a sterile syringe filter into a sterile test tube. Dilutions were made in sterile LB broth and PFU/ml was determined using the soft agar overlay method. A 1:1 ratio of 24 hour, 37° C. cultures of *L. monocytogenes* strains Lis-30 and Lis-146 were used for enumeration of phage. Plates were incubated at 32±2° C. for 48±4 h.

Figure 1B:
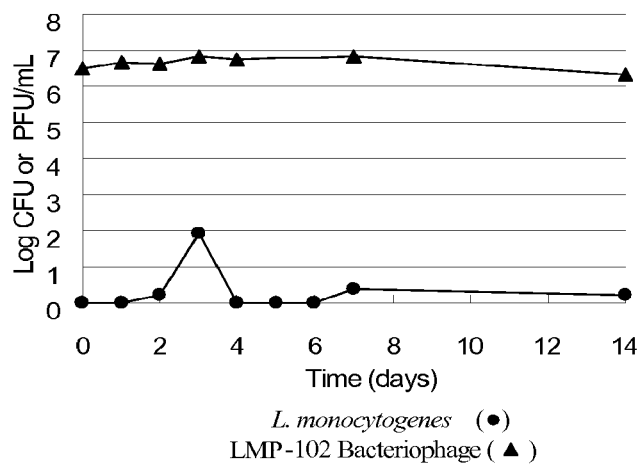

FIG. 1A is a log plot of CFU/mL and PFU/ml for Sample A as measured between 0 and 14 days. FIG. 1B, similarly, is a log plot of CFU/ml and PFU/ml for Sample B between 0 and 14 days. In Samples A and B the initial target inoculum of *L. monocytogenes* was $10^0$ CFU/ml. As shown in FIG. 1A, growth of *L. monocytogenes* was observed up to 7 days and then CFUs remained constant between 7 and 14 days. In contrast, for Sample B, which started with a higher density of LMP-102™, growth of *L. monocytogenes* was minimal. In Sample A, slight replication of the bacteriophage was observed; whereas in Sample B, the PFU levels declined slightly between day 0 and 14.

Figure 2A:
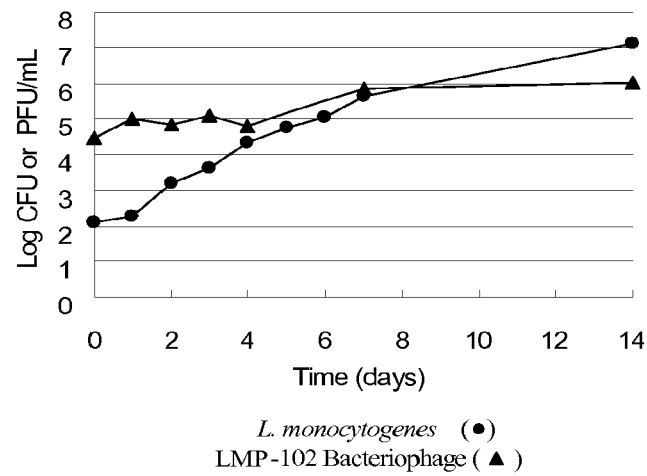
FIGS. 2A and 2B are log plots from Example 1, similar to FIGS. 1A and 1B, but at a higher initial level of *L. monocytogenes*.
Figure 2B:
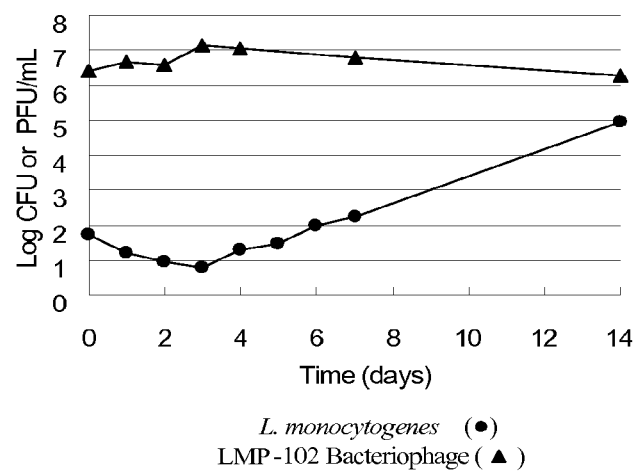

FIGS. 2A and 2B are similar plots for Samples C and D, respectively, in which the initial target inoculum of *L. monocytogenes* was $10^2$ CFU/ml. In Sample C, in which LMP-102™ started at a density of $4 \times 10^4$ PFU/ml, *L. monocytogenes* increased at a faster rate compared to Sample A. Sample D, with a starting density of LMP-102™ of $3 \times 10^6$ PFU/ml, also exhibited an increase in *L. monocytogenes*, although at a slower rate, and the CFU level at day 14 was less than for Sample C.

Figure 3A:
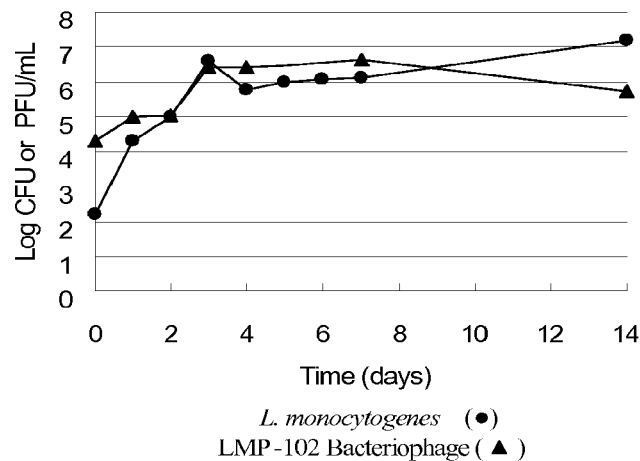
FIGS. 3A and 3B are log plots from Example 1 at the highest initial level of *L. monocytogenes*.
Figure 3B:
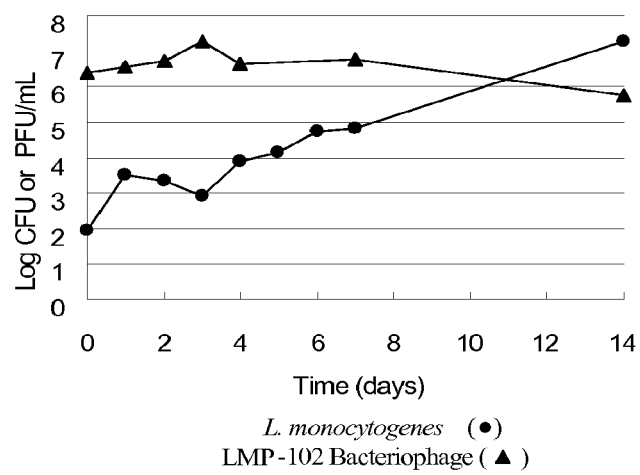

FIGS. 3A and 3B are plots of Samples E and F, respectively, having an initial target inoculum of $10^4$ CFU/ml. In both Samples E and F, the *L. monocytogenes* grew to similar levels by day 14.

The results in FIGS. 1A-3B illustrate that a PFU:CFU ratio of $10^6$:1 was required to suppress the growth of *L. monocytogenes* in 2% hot dog broth stored at 5±2° C. for up to 14 days. Note that other researchers have indicated that a ratio of $10^4$:1 was required for suppression of *Salmonella* in broth (Whichard et al., 2003) and *Pseudomonas* on red meat (Greer, 1988). At PFU:CFU ratios of 1:1, $10^2$:1, and $10^4$:1 (Samples A, C, D, E and F), growth of *L. monocytogenes* levels was observed. Moreover, replication of the bacteriophage was detected over the 14 day period in the hot dog broth for samples with an initial density of $10^4$ PFU/ml (see FIGS. 1A, 2A and 3A), independent of the initial *L. monocytogenes* CFU/ml level.

Figure 4A:
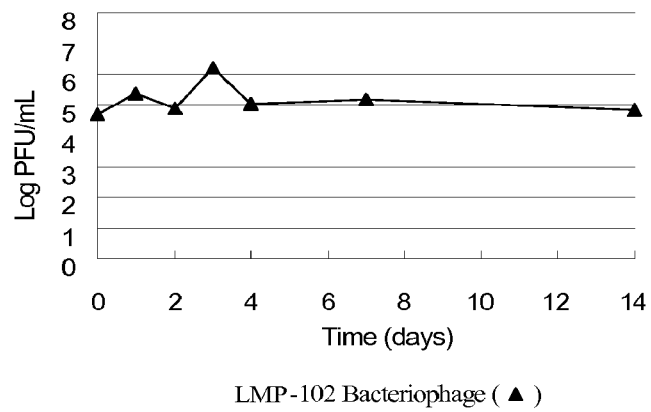
FIGS. 4A and 4B are log plots from Example 1 illustrating the stability of the bacteriophage in hot dog broth for a fourteen day period, in an absence of *L. monocytogenes*.
Figure 4B:
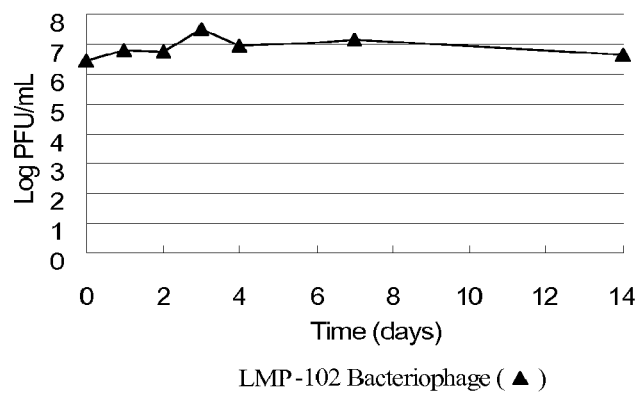

FIGS. 4A and 4B are plots of Samples G and H, neither of which was inoculated with *L. monocytogenes*. The results from FIGS. 4A and 4B illustrate that the bacteriophage remained unchanged (i.e. stable) when stored in hot dog broth for 14 days.

Example 2

The purpose of the test study in Example 2 was to determine the activity and stability of LMP-102™ bacteriophage on the surface of frankfurters and sliced roast beef stored in vacuum packages at 5±2° C. for up to 14 days. Samples were prepared with LMP-102™ in the presence and in the absence of *L. monocytogenes*.

LMP-102™, a mixture of six monophages which target *Listeria monocytogenes*, was produced by Intralytix, Inc., at the Warehouse at Camden Yards, 323 West Camden Street, Suite 675, Baltimore, Md., 21201. LMP-102™ was diluted appropriately in sterile deionized water to obtain a use-solution containing approximately $1 \times 10^8$ plaque forming units (PFU)/ml. The titer of LMP-102™ prior to dilution was estimated to be $3.0 \times 10^9$ PFU/ml.

The test system was *L. monocytogenes* ATCC 19115 (serogroup 4b) and was obtained from the American Type Culture Collection. The identification of *L. monocytogenes* ATCC 19115 was confirmed using a selective growth medium and Gram stain reaction assessment. The test system was transferred daily in Brain Heart Infusion broth at least three but less than 15 times following incubation at 37±2° C. for 24±4 hours. The subculture (recovery) medium used in the study was Modified Oxford Agar (MOX). Subculture incubation conditions were 37±2° C. for 48±4 hours.

The test system was centrifuged (5,000±100 revolutions per minute) for 10±1 minutes, the supernatant was decanted, and the pellet was suspended in an equivalent volume of 0.1% peptone. This suspension was diluted appropriately in 0.1% peptone to obtain a suspension containing approximately $2 \times 10^3$ colony forming units (CFU) per ml. This was the test system suspension.

Two ready-to-eat (RTE) food product types, frankfurters and sliced roast beef, were selected for the study. Sixty-three samples of sliced roast beef measuring 25 cm² (one side) were aseptically prepared and placed in sterile Petri plates. Sixty-three frankfurters were aseptically placed in Petri plates. The surface area of frankfurters was estimated using the equation for the surface area of a cylinder ($2\pi r^2 + 2\pi rh$). To obtain a surface area of 25 cm², frankfurters were selected based on a radius of about 0.7 cm and a height of 5 cm. Table 2 below provides additional detail on the two food products used in the test study of Example 2.

TABLE 2

RTE Product Information for Example 2

| Food Category | RTE Product | Name Brand | Ingredients | Number of Samples | Group |
|---|---|---|---|---|---|
| Cooked Cured Comminuted Products | Miniature Frankfurters, Turkey and Pork | Oscar Mayer | Mechanically separated turkey, pork, water, salt, contains less than 2% sodium lactate, corn syrup, dextrose, flavor, sodium phosphates, sodium erythorbate, sodium nitrite, sodium diacetate | 63 | A |
| Sliced Cooked Whole Muscle Cuts, Red Meat | Sliced Roast Beef | Hormel Signature USDA Roast Beef | Rubbed with salt, dextrose, garlic, onion powder, and spices | 63 | B |

The RTE product samples from Groups A and B were subject to one of three treatments. In Treatment 1, twenty-one samples of each RTE product were inoculated with the test system (*L. monocytogenes*), vacuum packaged, and stored at 5±2° C. for up to 14 days. In Treatment 2, twenty-one samples of each RTE product were inoculated with the test system, treated with the LMP-102™ use-solution, vacuum packaged, and stored at 5±2° C. for up to 14 days. The remaining twenty-one samples of each RTE product received Treatment 3, which consisted of treatment with the LMP-102™ use-solution, vacuum packaging, and storage at 5±2° C. for up to 14 days. Table 3 provides a summary of the samples and the treatment received for each sample group.

TABLE 3

| Food Product | Subgroup | Number of Samples | Details of Treatment |
|---|---|---|---|
| Frankfurters | A1 | 21 | Inoculated with *L. monocytogenes* |
| | A2 | 21 | Inoculated with *L. monocytogenes*; and Treated with LMP-102 |
| | A3 | 21 | Treated with LMP-102 |
| Roast Beef | B1 | 21 | Inoculated with *L. monocytogenes* |
| | B2 | 21 | Inoculated with *L. monocytogenes*; and Treated with LMP-102 |
| | B3 | 21 | Treated with LMP-102 |

Inoculation of the test system was performed by placing 100 µl of the test system suspension on the appropriate RTE product sample using a micropipettor. The inoculum was immediately spread over the surface (the upward facing surface in the case of the roast beef) of the sample with the micropipettor tip. Inoculated samples were incubated for 20±1 minutes at room temperature to allow for bacterial attachment before treatment with LMP-102™ or vacuum packaging.

The LMP-102™ use-solution was applied to treated RTE product samples in a spray, using a Preval® sprayer. Samples were sprayed for 5 seconds, which delivered a volume of approximately 415 µl onto the RTE product surface. Using this operating procedure, approximately 1.7× $10^6$ PFU of LMP-102™ per $cm^2$ was applied to treated RTE products samples. (The calculation: [(1×$10^8$ PFU/ml)× (0.415 ml)]/25 $cm^2$=1.7×$10^6$ PFU/$cm^2$.)

Samples were analyzed for populations of *L. monocytogenes* and/or LMP-102™ bacteriophage at 0, 1, 2, 3, 7, 10, and 14 days of storage at 5±2° C. Vacuum bags were aseptically opened and 38 ml of phosphate buffered dilution water (PBDW) was added before the samples were stomached (1 min±3 sec at 230±11 revolutions per minute). *Listeria monocytogenes* was enumerated by serially diluting the resulting stomachate in PBDW and using an MOX plate. Petri plates were incubated at 37±2° C. for 48±4 hours. LMP-102™ bacteriophage was enumerated by transferring 2 ml of the resulting stomachate to a sterile disposable syringe outfitted with a 1.0 µm (pore size) pre-filter followed in sequence with a 0.45 µm (pore size) filter. The filtrate was collected in sterile glass test tubes, diluted appropriately, and plated using the soft agar overlay technique and *Listeria monocytogenes* Lm-146 as the host strain. Plates were incubated at 32±2° C. for 48±4 hours. Following incubation, the plates were placed in a refrigerator (2-8° C.) until the results were read.

The population of *L. monocytogenes* was enumerated on MOX plates using the following equation: CFU/$cm^2$=CFU/ml×(38 ml)×(1/25 $cm^2$). The level of LMP-102™ bacteriophage was enumerated on LB plates using the following equation: PFU/$cm^2$=PFU/ml×(38 ml)×(1/25 $cm^2$). The CFU and PFU data was then converted to $\log^{10}$ CFU/$cm^2$ and $\log^{10}$ PFU/$cm^2$.

Analysis of each RTE product lot was conducted to ensure the absence of *Listeria* spp. prior to testing of Groups A and B. A 25-g sample of the same lot used for testing of each RTE product was stomached (1 min±3 sec at 230±11 rpm) in 225 ml of University of Vermont Modified *Listeria* selective enrichment broth. Stomacher bags were incubated at 32±2° C. for 24±4 hours before 0.1 ml was transferred to 10 ml of Fraser broth. Fraser broth tubes were incubated at 37±2° C. for 24±4 hours. A loopful (approximately 10 µl) of the Fraser broth enrichment was then streaked onto MOX plates, which were incubated at 37±2° C. for 24±4 hours. The results indicated that *Listeria* spp. was absent from the two RTE product lots used in the study.

Figure 5:
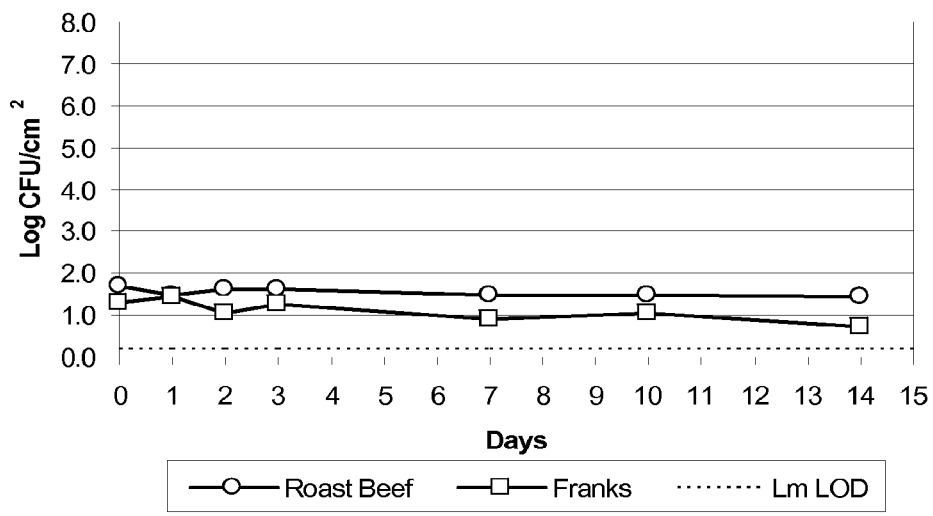
FIG. 5 is a log plot from Example 2 of Colony Forming Units (CFU) per $cm^2$ on frankfurters and roast beef contaminated with *L. monocytogenes* and measured over a fourteen day period.

FIG. 5 is a log plot of colony forming units (CFU) per $cm^2$ over the fourteen day storage period for the frankfurters and roast beef, which were inoculated with *L. monocytogenes*, but not treated with LMP-102 ™ (subgroups A1 and B1 of Table 3). The CFU levels for the frankfurters and the roast beef remained relatively stable over the 14 day period.

Figure 6:
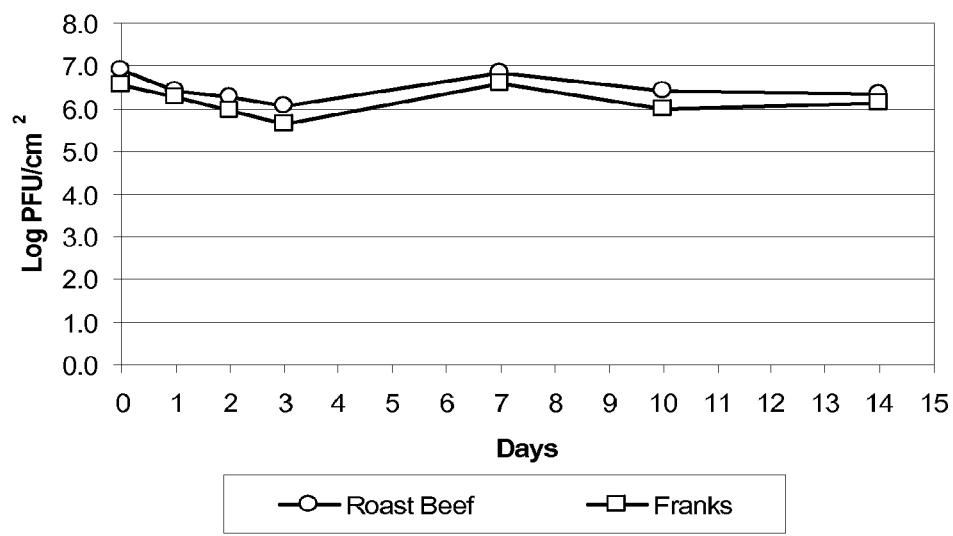
FIG. 6 is a log plot from Example 2 of Plaque Forming Units (PFU) per $cm^2$ on frankfurters and roast beef treated with a bacteriophage and measured over a fourteen day period.

FIG. 6 is a log plot of plaque forming units (PFU) per cm$^2$ for subgroups A3 and B3, which were treated with LMP-102™, in the absence of *L. monocytogenes*. As shown in FIG. 6, the populations of the LMP-102™ bacteriophage remained stable over the 14-day storage period.

Figure 7:
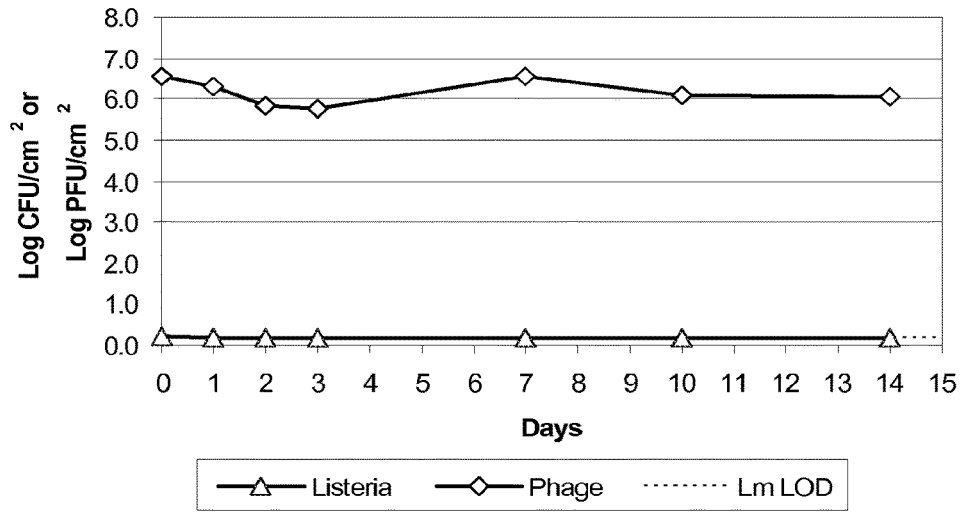
FIG. 7 is a log plot from Example 2 of CFU per $cm^2$ and PFU per $cm^2$ for frankfurters contaminated with *L. monocytogenes* and treated with a bacteriophage, as measured over a fourteen day period.
Figure 8:
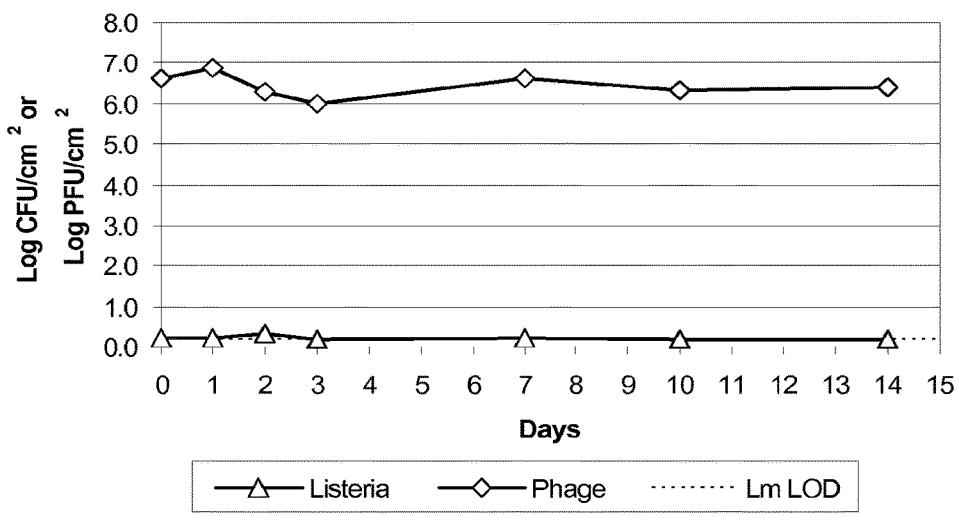
FIG. 8 is a log plot similar to FIG. 7 for roast beef samples contaminated with *L. monocytogenes* and treated with a bacteriophage.

FIG. 7 is a log plot of CFU/cm$^2$ and PFU/cm$^2$ for the frankfurters that were inoculated with *L. monocytogenes* and treated with LMP-102 ™ (subgroup A2). FIG. 8 is a similar plot for the roast beef that underwent the same treatment (subgroup B2). FIGS. 7 and 8 show that, in the presence of *L. monocytogenes*, the LMP-102™ bacteria still remained stable over 14 days of storage at 5±2° C. The results in FIGS. 7 and 8 also illustrate that populations of *L. monocytogenes* on frankfurters and sliced roast beef were reduced to the limit of detection (Lm LOD) when the frankfurters and roast beef were treated with LMP-102™. In contrast, FIG. 5 illustrated that *L. monocytogenes* levels remained above the detection limit for frankfurters and roast beef samples not treated with bacteriophage.

In summary, the test study of Example 2 illustrates that the LMP-102™ bacteriophage remained stable on frankfurters and sliced roast beef samples over a 14 day storage period at 5±2° C., regardless of whether LMP-102™ was in the presence or absence of *L. monocytogenes*. For those samples in which LMP-102™ was treated on frankfurters and sliced roast beef samples contaminated with *L. monocytogenes*, the LMP-102 ™ reduced the populations of *L. monocytogenes* to or below the limit of detection.

Example 3

The objective of the test study defined as Example 3 was to determine the extended antilisterial activity of a LMP-102™ bacteriophage treatment applied to sliced roast beef and frankfurters. More specifically, the objective was to determine if the bacteriophage is able to prevent the growth of *L. monocytogenes* introduced to the roast beef and frankfurters some time after the bacteriophage treatment was applied.

LMP-102™, a mixture of six monophages which target *Listeria monocytogenes*, was produced by Intralytix, Inc., at the Warehouse at Camden Yards, 323 West Camden Street, Suite 675, Baltimore, Md., 21201. LMP-102 ™ was diluted to approximately 9±0.5 log$_{10}$ PFU/ml.

The test system was *L. monocytogenes* ATCC 19115 (serogroup 4b). A tube of Brian Heat Infusion (BHI) broth was inoculated with the test system, followed by incubation at 37±2° C. for 24±4 hours. The strain was then propagated in 10 ml of BHI broth and then incubated at 37±2° C. for 24±4 hours, followed by at least three, but less than fifteen, loop transfers. The culture (test system) was centrifuged (5,000±100 revolutions per minute (rpm)) for 10±1 min at room temperature and suspended in an equivalent amount of sterile 0.1% peptone. The suspension was then diluted appropriately in sterile 0.1% peptone to obtain a dilution containing approximately 1×10$^4$ CFU/ml, which was used as the test system suspension.

The presence of *Listeria* spp. in each RTE product lot was determined by stomaching (1 min±3 sec at 230±11 rpm) a 25±2-g sample of the lot in 225 ml of University of Vermont Modified *Listeria* selective enrichment broth. The stomacher bags were incubated at 32±2° C. for 24±4 h before transferring 0.1 ml to 10 ml of Fraser broth. The Fraser broth tubes were then incubated at 37±2° C. for 24±4 h. A loopful (approximately 10 µl) of the Fraser broth enrichment was then streaked onto Modified Oxford Agar (MOX). The plates were incubated at 37±2° C. for 24±4 h. Any product lots that were recorded as position for the presence of *Listeria* spp. were not used in the study. The RTE product lots were refrigerated while *Listeria* analysis was performed.

Forty-eight samples of sliced roast beef of approximately 25 cm$^2$ (surface area of one side) were prepared using a sterile stainless steel blade, a sterile stainless steel template, and a disinfected cutting surface. Each sample was placed in a sterile Petri plate. Forty-eight mini frankfurters were aseptically placed in sterile Petri plates. An estimation of the surface area of the frankfurters was determined using the equation for the surface area of a cylinder: $2\pi r^2 + 2\pi rh$. Additional details on the two food products are shown in Table 4 below.

TABLE 4

RTE Product Information for Example 3

| Food Category | RTE Product | Name Brand | Ingredients | Number of Samples |
|---|---|---|---|---|
| Cooked, Cured, Comminuted Products, Red Meat | Frankfurters | Ambassador Our Old Fashioned Little Weiners | Pork, water, dextrose, salt, corn syrup, sodium lactate, sodium phosphates, natural spices, monosodium glutamate, paprika, sodium erythorbate, garlic, sodium nitrate, natural flavorings | 48 |
| Sliced Cooked Whole Muscle Cuts, Uninjected, Red Meat | Sliced Roast Beef | Signature USDA Roast Beef, Hormel Foods | Round, rubbed with salt, dextrose, garlic and onion powder and spices | 48 |

Forty milliliters of the LMP-102™ dilution was added to a sterile reservoir bottle fitted for a Paasche airbrush (Model H#3L, Paasche Airbrush Co.). Forty milliliters of 250 ppm synthetic hard water was added to a second sterile reservoir bottle fitted for a Paashe airbrush. Ten milliliters of the synthetic hard water is added to a sterile test tube and incubated at 32±2° C. for 48±4 h to check for diluent sterility. The flow rate of the airbrush was adjusted to deliver 50±10 µl/4 sec.

Figure 9:
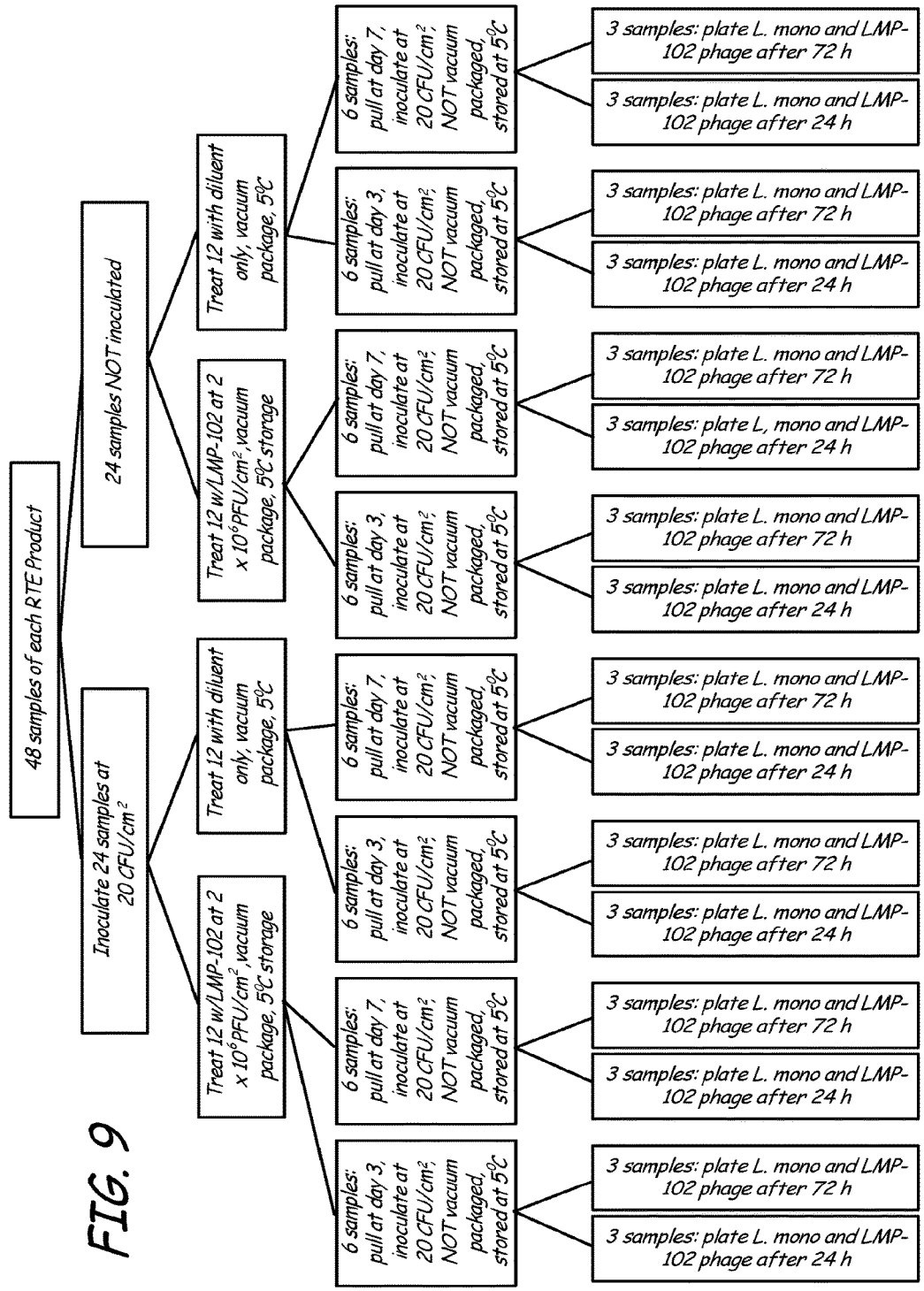
FIG. 9 is a flow diagram illustrating steps of a test study in Example 3.

As stated above, 48 samples for each meat product were prepared (96 samples total). The samples were divided into groups and subgroups, which underwent different processing. FIG. 9 is a flow diagram illustrating the processing steps for each of the different subgroups. Half of the samples (24) for each of the products were inoculated with *L. monocytogenes* at 20 CFU/cm². The other half of the samples were not initially inoculated, but underwent the same subsequent treatments as the inoculated samples. (See FIG. 9.)

The inoculated samples were then divided into two subgroups. The first subgroup (12 samples for each food product) was sprayed with LMP-102™ at $2 \times 10^6$ PFU/cm². The second subgroup was sprayed with synthetic hard water. Both subgroups were then vacuum packaged and stored at 5° C.±3 degrees for 3 or 7 days. Six of the samples were removed after 3 days and re-inoculated, or recontaminated, with *L. monocytogenes*, followed by storage at 5° C.±3 degrees. (The samples were not vacuum packaged again after the re-inoculation.) The other six samples treated with LMP-102™ were removed from storage after 7 days and re-inoculated, returned to storage, but not vacuum packaged. The other 12 samples treated with synthetic hard water were also divided into two subgroups that underwent the same processing (i.e. 6 samples removed at day 3 and inoculated; 6 samples removed at day 7 and inoculated). Each of the 6 samples were then divided again into two subgroups. Three samples were removed after 24 hours and populations of *L. monocytogenes* and LMP-102™ levels were determined. The three samples in the second subgroup were removed after 72 hours and populations of *L. monocytogenes* and LMP-102™ levels were determined.

As illustrated in FIG. 9, half of the samples for each food product were contaminated prior to the bacteriophage treatment. The samples were then recontaminated at 3 days or 7 days after the bacteriophage treatment. The test study was intended, in part, to imitate a possible scenario in which the meat products were initially contaminated at the food processor, followed by a bacteriophage treatment, and then recontaminated at a later point in time, for example, at the deli during slicing of the meat products. The test study of Example 3 also may imitate other scenarios, such as, for example, the situation in which a presliced, prepackaged food product is initially contaminated at the food processing facility prior to packaging. The food product may then be sold at a retailer and then recontaminated at some point after the consumer opens the packaging, but does not consume all of the food product.

Table 5 below shows the bacteriophage levels for the 48 samples of the sliced roast beef, as measured at 24 hours and 72 hours after recontamination or re-inoculation with *L. monocytogenes*. Recontamination occurred at 3 days or 7 days after the bacteriophage treatment. Table 6 shows the same results for the 48 samples of frankfurters.

TABLE 5

LMP-102 ™ Bacteriophage ($\log_{10}$ PFU/cm²) on Sliced Roast Beef

| Initial | | Storage time, post-treatment | | | |
| --- | --- | --- | --- | --- | --- |
| Inoculum | | 3 days | | 7 days | |
| Level (CFU/cm²) | Treatment | 24 h post recontamination | 72 h post recontamination | 24 h post recontamination | 72 h post recontamination |
| 0 | LMP-102 | 6.64 | 6.66 | 6.53 | 6.53 |
| | Water | <0.30[a] | <0.30 | <0.30 | <0.30 |
| 20 | LMP-102 | 6.45 | 6.65 | 6.52 | 6.51 |
| | Water | <0.30 | <0.30 | <0.30 | <0.30 |

[a] Limit of detection of the assay was 0.30 $\log_{10}$ PFU/ml

TABLE 6

LMP-102 ™ Bacteriophage ($\log_{10}$ PFU/cm²) on Frankfurters

| Initial | | Storage time, post-treatment | | | |
| --- | --- | --- | --- | --- | --- |
| Inoculum | | 3 days | | 7 days | |
| Level (CFU/cm²) | Treatment | 24 h post recontamination | 72 h post recontamination | 24 h post recontamination | 72 h post recontamination |
| 0 | LMP-102 | 6.35 | 6.43 | 6.47 | 6.40 |
| | Water | <0.30[a] | <0.30 | <0.30 | <0.30 |
| 20 | LMP-102 | 6.25 | 5.86 | 6.07 | 6.37 |
| | Water | <0.30 | <0.30 | <0.30 | <0.30 |

[a] Limit of detection of the assay was 0.30 $\log_{10}$ PFU/ml

The results in Tables 5 and 6 illustrate that the levels of the bacteriophage remained stable and within 0.51 $\log_{10}$ PFU/cm$^2$ on both food products throughout the study Moreover, an initial inoculation with *L. monocytogenes* did not have an impact on the bacteriophage levels measured after recontamination.

Tables 7 and 8 contain the measured populations of *L. monocytogenes* for the 48 samples of roast beef and 48 samples of frankfurters.

TABLE 7

*L. monocytogenes* ($\log_{10}$ CFU/cm$^2$) on Sliced Roast Beef

| Initial Inoculum Level (CFU/cm$^2$) | Treatment | Storage time, post-treatment | | | |
|---|---|---|---|---|---|
| | | 3 days | | 7 days | |
| | | 24 h post recontamination | 72 h post recontamination | 24 h post recontamination | 72 h post recontamination |
| 0 | LMP-102 | 0.88 | 0.92 | <0.30$^a$ | <0.30 |
| | Water | 1.65 | 1.72 | 1.68 | 1.60 |
| 20 | LMP-102 | 1.05 | 0.72 | 0.78 | 0.50 |
| | Water | 1.82 | 1.88 | 1.72 | 1.78 |

$^a$Limit of detection of the assay was 0.30 $\log_{10}$ CFU/ml

TABLE 8

*L. monocytogenes* ($\log_{10}$ CFU/cm$^2$) on Frankfurters

| Initial Inoculum Level (CFU/cm$^2$) | Treatment | Storage time, post-treatment | | | |
|---|---|---|---|---|---|
| | | 3 days | | 7 days | |
| | | 24 h post recontamination | 72 h post recontamination | 24 h post recontamination | 72 h post recontamination |
| 0 | LMP-102 | 1.25 | 0.70 | 0.52 | <0.30$^a$ |
| | Water | 1.62 | 1.25 | 1.53 | 1.60 |
| 20 | LMP-102 | 1.27 | 0.92 | 0.40 | 0.50 |
| | Water | 1.47 | 1.25 | 1.39 | 1.78 |

$^a$Limit of detection of the assay was 0.30 $\log_{10}$ PFU/ml

The CFU data from Tables 7 and 8 illustrates that the food products treated with LMP-102™ had lower populations of *L. monocytogenes* as compared to the other half of the samples which were treated with water. This was consistent for both the frankfurters and the roast beef; and the reduction in *L. monocytogenes* was independent of the initial inoculum level. For both the frankfurters and the roast beef, CFUs were lower for the samples that were recontaminated at 7 days rather than at 3 days.

Figure 10:
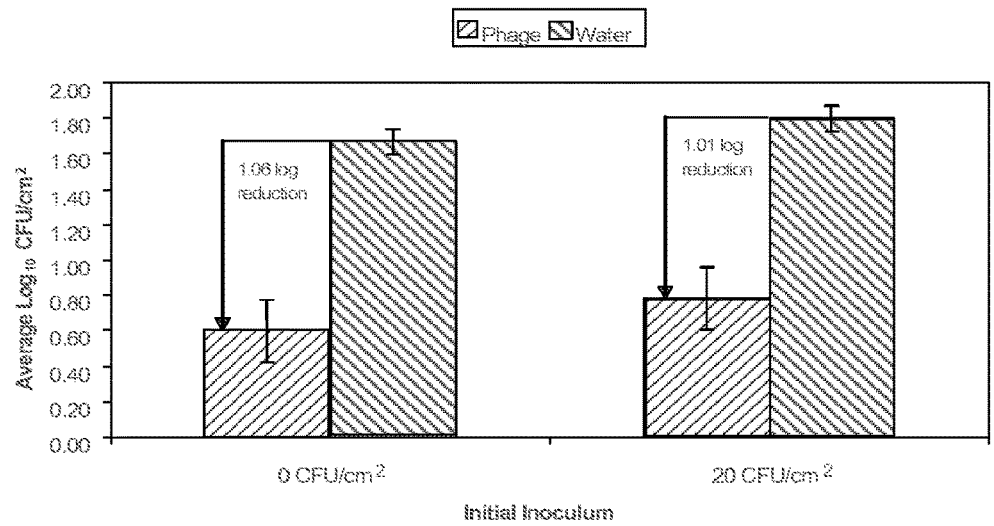
FIG. 10 is a log plot of CFU per $cm^2$ for roast beef samples contaminated with *L. monocytogenes* after being treated with a bacteriophage, compared to roast beef samples contaminated with *L. monocytogenes* after being treated with water.

FIGS. 10-13 are various plots of the CFU data from Tables 7 and 8. FIG. 10 is a plot of average values of $\log_{10}$ CFU/cm$^2$ from Table 7 for the roast beef samples, comparing the LMP-102 ™ treated samples to the samples treated with water. Each of the graphical bars in FIG. 10 is an average of the four values listed in the table for that particular group. As an example, for the phage treated samples with an initial inoculum level of zero CFU/cm$^2$, the plotted value is equal to 0.6 $\log_{10}$ CFU/cm$^2$, which is the average of 0.88, 0.92, 0.30 and 0.30. (See Table 7.) Similarly, water treated samples at an initial inoculum of zero CFU/cm$^2$ have an average $\log_{10}$ CFU/cm$^2$ value equal to 1.66 based on values of 1.65, 1.72, 1.68 and 1.60. As compared to the roast beef samples treated with water, those that were treated with LMP-102™ had a 1.06 log reduction in *L. monocytogenes*. The results were similar for the roast beef samples having an initial inoculum level of 20 CFU/ cm$^2$. There was a 1.01 log reduction for the phage treated samples compared to the water treated samples.

Figure 11:
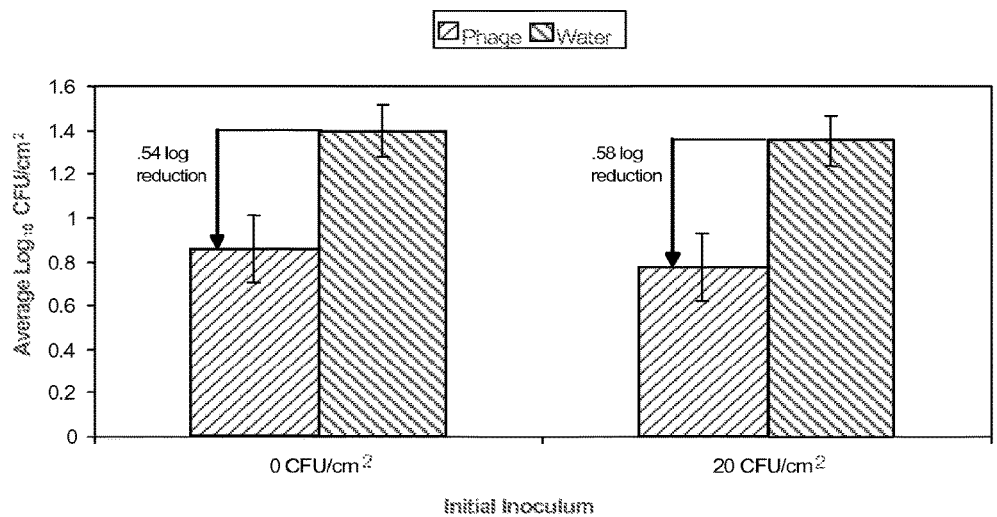
FIG. 11 is a log plot similar to FIG. 10 for frankfurter samples.

FIG. 11 is similar to FIG. 10, but shows the results for the frankfurter samples from Table 8. Similar to the roast beef samples, the samples treated with the LMP-102™ bacteriophage had a lower level of *L. monocytogenes* compared to the samples treated with water. As also shown in FIG. 10, the initial inoculum level did not have an impact on the reduction of *L. monocytogenes*.

Figure 12:
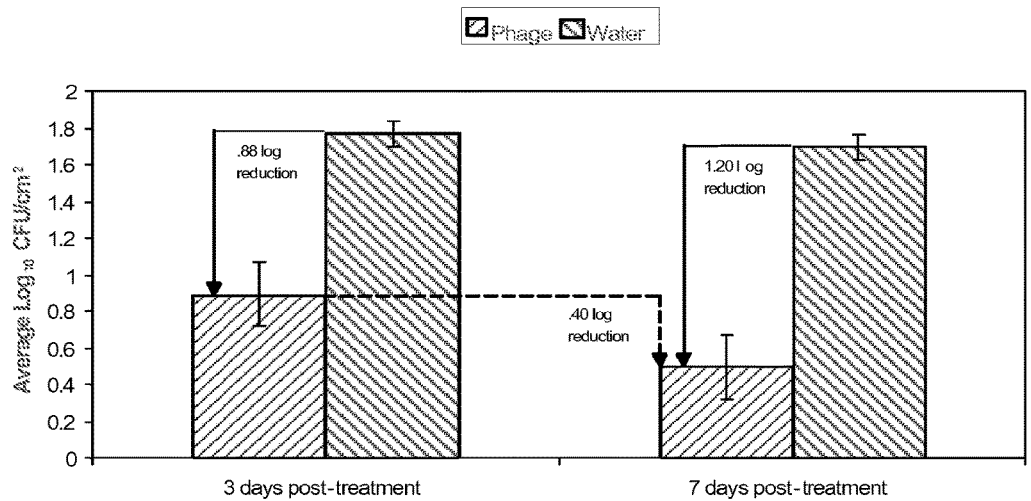
FIG. 12 is a log plot of CFU per $cm^2$ for roast beef samples contaminated three or seven days after the bacteriophage treatment, compared to roast beef samples contaminated three or seven days after the water treatment.
Figure 13:
FIG. 13 is a log plot similar to FIG. 12 for frankfurter samples.

FIGS. 12 and 13 are plots of the average $\log_{10}$ CFU/cm$^2$ values for *L. monocytogenes* as a function of the storage time between the treatment with LMP-102™ (or water) and recontamination with *L. monocytogenes*. The plotted values are an average for the two initial inoculum levels and the two recontamination periods (i.e. 24 hours or 72 hours). As an example, in FIG. 12 for the roast beef samples, the phage treated samples with 3 days of storage post-treatment have an average value of 0.89 $\log_{10}$ CFU/cm$^2$ based on the values from Table 7 of 0.88, 0.92, 1.05 and 0.72. For the water treated samples with 3 days of storage, the plotted value of 1.77 $\log_{10}$ CFU/cm$^2$ is an average of 1.65, 1.72, 1.82 and 1.88 from Table 7.

The results in FIG. 12 show that the roast beef samples treated with the LMP-102™ bacteriophage had lower populations of *L. monocytogenes* compared to those samples treated with water. This applied to the 3 day storage group and the 7 day storage group. These results show that the bacteriophage is able to reduce bacterial growth even when *L. monocytogenes* is introduced to the roast beef some time after (i.e. 3 days or 7 days) the bacteriophage has been applied. The phage treated samples at 7 days post-treatment had a lower CFU value than the phage treated samples at 3 days post-treatment. Thus, a larger reduction in *L. monocytogenes* occurred when there was a longer storage period between phage treatment and recontamination.

FIG. 13 shows similar results to FIG. 12 for the frankfurter samples. The average CFU values for the phage treated samples in FIG. 13 are similar to those in FIG. 12. However, the difference in CFU values between the phage treated samples and the water treated samples is not as significant as the difference noted in FIG. 12 for the roast beef samples. FIG. 13 also supports the finding that longer storage times between treatment and recontamination results in a larger reduction in L. monocytogenes.

The test study of Example 3 shows that LMP-102™ was able to kill its target bacteria, L. monocytogenes, up to seven days after LMP-102™ had been applied to the food product and packaged with the food product. The extended activity of the bacteriophage was independent of whether the food product was initially contaminated when the bacteriophage treatment was applied to the food product. The results of this test study have significant impact since many foods, particularly RTE foods, may become contaminated after they are packaged. The bacteriophage treatment described herein is able to offer extended protection throughout a shelf life of a food product, provided that the bacteriophage treatment is packaged with the food product in a manner that maintains the viability of the bacteriophage.

The bacteriophage described herein may be applied to a food product once or more than once. For some food products, such as those that undergo significant processing, it may be preferred to apply multiple bacteriophage treatments. Surrounding surfaces, as well as water systems, may also be treated with a bacteriophage. As also described above, the bacteriophage treatment may used in combination with other types of anti-bacterial treatments.

Although the present invention has been described with reference to preferred embodiments, workers skilled in the art will recognize that changes may be made in form and detail without departing from the spirit and scope of the invention.

What is claimed is:

1. A method of treating and preventing bacterial contamination in a meat food product, the method comprising:
applying a bacteriophage treatment to a packaging material as a foam, the bacteriophage treatment comprising:
at least one bacteriophage in a concentration sufficient to reduce or eliminate bacteria selected from the group consisting of pathogenic bacteria, spoilage bacteria, and combinations thereof;
a buffering agent to maintain the bacteriophage treatment at a pH between approximately 4 and 9;
from about 25 ppm to about 2.0 weight percent of a foaming surfactant selected from the group consisting of alcohol ethoxylates, alcohol ethoxylate carboxylate, amine oxides, alkyl sulfates, alkyl ether sulfate, sulfonates, quaternary ammonium compounds, alkyl sarcosines, betaines, alkyl amides and mixtures thereof; and
an adjuvant comprising one or more of calcium, magnesium, a competitive exclusion bacteria, a fatty acid, a terpene, a terpenoid, glycerol, and propylene glycol, and
packaging the food product in the packaging material.

2. The method of claim 1 further comprising applying a protectant system to the packaging material, the protectant system comprising a barrier film, a UV light blocking film, a buffering agent, a salt having a divalent cation, salts of gluconic acid, a modified atmosphere, or a combination thereof.

3. The method of claim 1 further comprising providing the packaging material with a deactivating component capable of inactivating the bacteriophage at a predetermined time after packaging of the food product in the packaging material.

4. The method of claim 3, wherein the deactivating component is selected from non-pathogenic bacteria capable of degrading the bacteriophage, controlled release enzymes, controlled chlorine releasing agents, encapsulated enzymes or organic acids that are released upon hydration, oxychloro species releasing agents, peroxyacids, and combinations thereof.

5. The method of claim 1, wherein the packaging material comprises a bag, a pouch, a film, a tray, a bowl, a clam shell, web packaging, or hot dog packaging.

6. The method of claim 1, wherein the bacteriophage treatment is applied to the packaging material by spraying.

7. The method of claim 1, wherein the food product comprises a raw meat product.

8. A method of treating or preventing bacterial contamination in a meat food product, the method comprising:
applying a bacteriophage treatment to a packaging material, the bacteriophage treatment comprising:
at least one bacteriophage in a concentration of about $10^5$ to about $10^{11}$ Plaque Forming Units (PFU)/mL;
a buffering agent to maintain the bacteriophage treatment at a pH between approximately 4 and 9; and
from about 25 ppm to about 2.0 weight percent of a surfactant, and
packaging the food product in the packaging material,
wherein the method is able to treat or prevent bacterial growth when applying the bacteriophage treatment occurs up to 14 days prior to bacterial contamination.

9. The method of claim 8, wherein the food product comprises a food product that has not been contaminated with pathogenic bacteria or spoilage bacteria prior to the bacteriophage treatment contacting the food product.

10. The method of claim 8, wherein the bacteriophage is stable for up to 7 days after the step of applying the bacteriophage treatment.

11. The method of claim 8, wherein the bacteriophage is stable for up to 7 days after the step of applying the bacteriophage treatment, when the packaging material and the food product have not been contamination prior to applying the bacteriophage treatment.

12. The method of claim 8 further comprising applying a deactivating component capable of inactivating the bacteriophage after a predetermined time.

13. The method of claim 12, wherein the deactivating component is selected from non-pathogenic bacteria capable of degrading the bacteriophage, controlled release enzymes, controlled chlorine releasing agents, encapsulated enzymes or organic acids that are released upon hydration, oxychloro species releasing agents, peroxyacids, and combinations thereof.

14. The method of claim 12, wherein the predetermined time comprises an estimate of when the bacteriophage treatment has eliminated a majority of bacteria.

15. The method of claim 8 further comprising applying a second bacteriophage treatment to the food product, the second bacteriophage treatment comprising a second bacteriophage that is different from the at least one bacteriophage.

* * * * *